US011493829B2

(12) United States Patent
Ito et al.

(10) Patent No.: US 11,493,829 B2
(45) Date of Patent: Nov. 8, 2022

(54) INTERCHANGEABLE LENS DEVICE, IMAGING DEVICE, IMAGING SYSTEM, METHOD, AND PROGRAM

(71) Applicant: Sony Group Corporation, Tokyo (JP)

(72) Inventors: Tomoomi Ito, Kanagawa (JP); Yoshinori Yamatsuta, Kanagawa (JP); Shinichi Fujii, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 200 days.

(21) Appl. No.: 16/625,970

(22) PCT Filed: Apr. 25, 2018

(86) PCT No.: PCT/JP2018/016829
§ 371 (c)(1),
(2) Date: Dec. 23, 2019

(87) PCT Pub. No.: WO2019/003614
PCT Pub. Date: Jan. 3, 2019

(65) Prior Publication Data
US 2020/0174342 A1 Jun. 4, 2020

(30) Foreign Application Priority Data

Jun. 27, 2017 (JP) .............................. JP2017-124826

(51) Int. Cl.
*H04N 5/232* (2006.01)
*G03B 13/36* (2021.01)
(Continued)

(52) U.S. Cl.
CPC ............... *G03B 13/36* (2013.01); *G02B 7/08* (2013.01); *G02B 7/09* (2013.01); *G02B 7/10* (2013.01); *G03B 17/14* (2013.01)

(58) Field of Classification Search
CPC .......... G03B 13/36; G03B 17/14; G02B 7/08; G02B 7/09; G02B 7/10; H04N 5/23212
(Continued)

(56) References Cited

U.S. PATENT DOCUMENTS 4,914,464 A   4/1990 Azuma et al.
2005/0078381 A1* 4/2005 Okawara ................. G03B 3/10
                                                        359/697
(Continued)

FOREIGN PATENT DOCUMENTS

CN    1232985 A    10/1999
CN    1700738 A    11/2005
(Continued)

OTHER PUBLICATIONS

Extended European Search Report dated May 15, 2020 for corresponding European Application No. 18823805.9.
(Continued)

*Primary Examiner* — Usman A Khan
(74) *Attorney, Agent, or Firm* — Michael Best & Friedrich LLP

(57) ABSTRACT

Provided are a device and a method by which high-precision auto focus (AF) processing can be performed while a focus lens or a zoom lens is being operated. An interchangeable lens acquires position information regarding a focus lens and a zoom lens at a predetermined time interval during an exposure time period of detection information acquisition pixels for use in calculation of a defocus amount (DF), and outputs the position information to an imaging device. The imaging device calculates the defocus amount (DF) by using information regarding the detection information acquisition pixels, calculates a reference focus lens position (Ref_fc) by using points, on a cam curve, corresponding to the inputted lens position information, calculates a target focus lens
(Continued)

position (Tgt_fc) in an in-focus position, from the reference focus lens position (Ref_fc) and the defocus amount (DF), and outputs the target focus lens position (Tgt_fc) to the interchangeable lens.

17 Claims, 22 Drawing Sheets

(51) Int. Cl.
*G02B 7/08* (2021.01)
*G02B 7/09* (2021.01)
*G02B 7/10* (2021.01)
*G03B 17/14* (2021.01)

(58) Field of Classification Search
USPC .......................................................... 348/345
See application file for complete search history.

(56) References Cited

U.S. PATENT DOCUMENTS

| | | | |
|---|---|---|---|
| 2006/0120709 A1* | 6/2006 | Kobayashi | H04N 5/232125 396/80 |
| 2006/0290800 A1* | 12/2006 | Ohkawa | G02B 7/102 348/335 |
| 2007/0165290 A1* | 7/2007 | Przygodda | G11B 7/0065 |
| 2008/0025715 A1 | 1/2008 | Ishii | |
| 2009/0040341 A1 | 2/2009 | Ueyama | |
| 2009/0190023 A1* | 7/2009 | Mise | G03B 13/00 348/345 |
| 2009/0190909 A1* | 7/2009 | Mise | G02B 7/38 396/80 |
| 2010/0315537 A1* | 12/2010 | Abe | H04N 5/23296 348/240.3 |
| 2012/0194732 A1 | 8/2012 | Masuda | |
| 2013/0128094 A1* | 5/2013 | Mise | H04N 5/23245 348/335 |
| 2014/0267831 A1* | 9/2014 | Uchiyama | H04N 5/232122 348/231.6 |
| 2015/0241756 A1* | 8/2015 | Uchiyama | H04N 5/232123 348/347 |
| 2016/0306135 A1* | 10/2016 | Kakimoto | G03B 17/14 |
| 2017/0264812 A1* | 9/2017 | Kamba | G02B 7/102 |

FOREIGN PATENT DOCUMENTS

| | | |
|---|---|---|
| CN | 101363952 A | 2/2009 |
| CN | 101387734 A | 3/2009 |
| CN | 102027412 A | 4/2011 |
| CN | 102629068 A | 8/2012 |
| CN | 103424959 A | 12/2013 |
| JP | 2009258680 A | 11/2009 |
| JP | 2010049202 A | 3/2010 |
| JP | 2010092035 A | 4/2010 |
| JP | 2013057751 A | 3/2013 |
| JP | 2014-137468 A | 7/2014 |
| JP | 2017037103 A | 2/2017 |
| KR | 2006-0121436 A | 11/2006 |
| WO | 2009/141988 A1 | 11/2009 |

OTHER PUBLICATIONS

Japanese Notice of Allowance dated Jan. 11, 2022 for corresponding Japanese Application No. 2019-526639.

* cited by examiner

FIG. 3

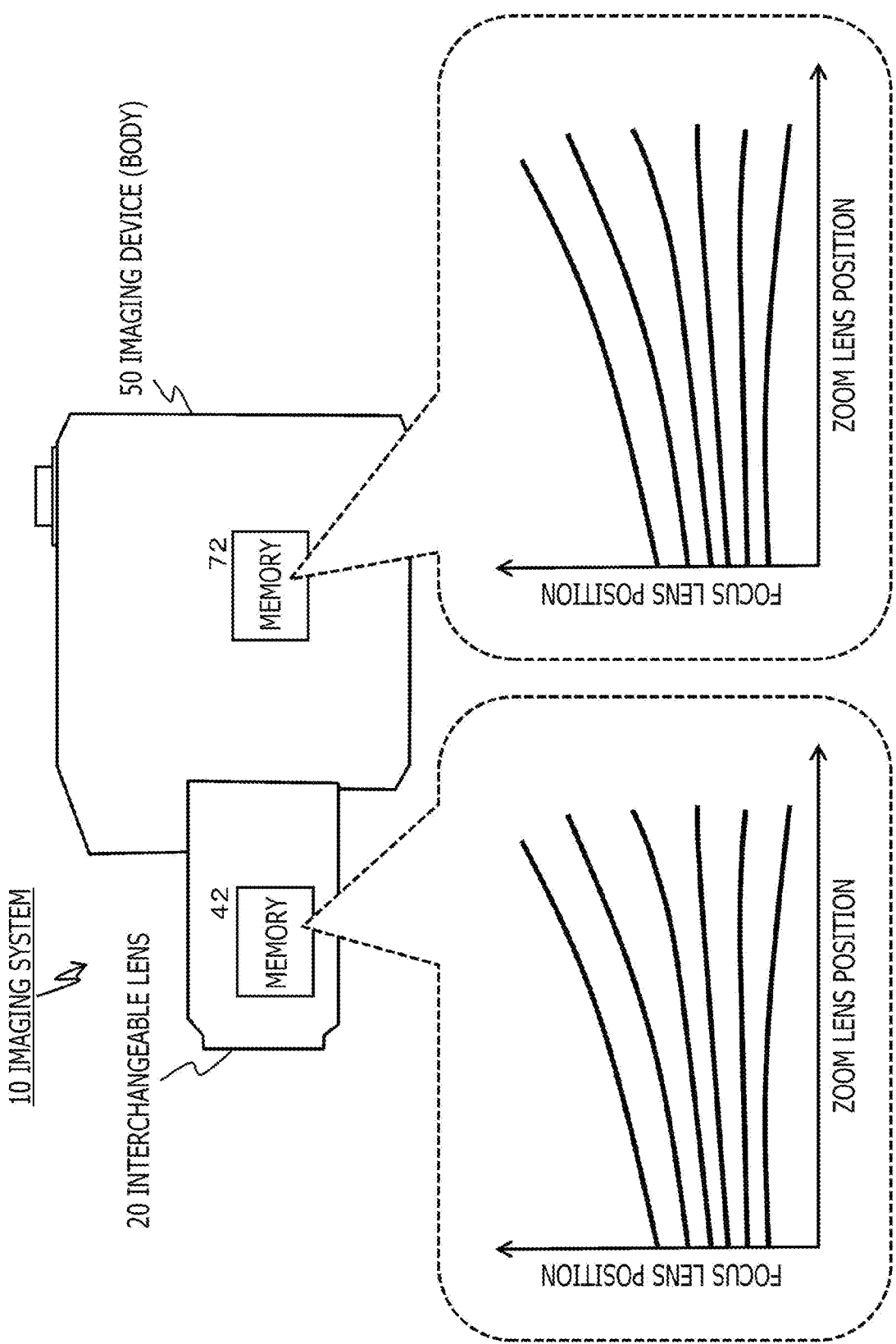
F I G. 9

FIG.12

| CLOCK TIME [msec] | ZOOM LENS (Zm) POSITION | FOCUS LENS (Fc) POSITION |
|---|---|---|
| ts0 | zm0 | fc0 |
| ts1 | zm1 | fc1 |
| ts2 | zm2 | fc2 |
| ts3 | zm3 | fc3 |
| ts4 | zm4 | fc4 |
| ts5 | zm5 | fc5 |
| ts6 | zm6 | fc6 |
| ts7 | zm7 | fc7 |
| ts8 | zm8 | fc8 |
| .. | .. | .. |

Gp1: ts0–ts3
Gp2: ts4–ts7

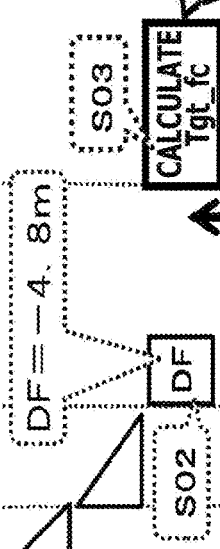
FIG. 14

INTERCHANGEABLE LENS DEVICE, IMAGING DEVICE, IMAGING SYSTEM, METHOD, AND PROGRAM

TECHNICAL FIELD

The present disclosure relates to an interchangeable lens device, an imaging device, an imaging system, a method, and a program, and particularly, relates to an interchangeable lens device, an imaging device, an imaging system, a method, and a program for performing auto focus (AF) processing.

BACKGROUND ART

In a case where image photographing using a camera (imaging device) is carried out, focus adjustment (focusing point adjustment) which is a process for focusing on a subject is necessary.

Most existing cameras have auto focus (AF) functions for automatically performing such focus adjustment.

There are some methods for implementing an AF function. These methods include, for example, the following methods:

a contrast detection method involving acquiring photographed images at a plurality of focus lens set positions, and setting, as a focus position (in-focus position), a position at which the photographed image having the highest contrast has been acquired; and a phase difference detection method involving generating a pair of images by pupil-splitting light having passed through an imaging lens, and analyzing the phase difference between the generated pair of images, thereby detecting a focus position (in-focus position).

These methods have been known.

Note that, for example, PTL 1 (Japanese Patent Laid-open No. 2014-137468), etc. describes a process for detecting a focus position (in-focus position) by the phase difference detection method.

In order to achieve high-speed auto focusing (AF), a focus position (in-focus position) needs to be decided with a focus lens being driven.

However, in each of the contrast detection and the phase difference detection, when the above processing is performed, at which focus lens position the contrast detection information or phase difference detection information is obtained is unclear. Thus, there is a problem that high-precision auto focusing (AF) is difficult.

Moreover, when a user (photographing person) carries out zoom adjustment to drive a zoom lens during execution of auto focus (AF) processing, the focus position is changed. Thus, there is a problem that high-precision auto focusing (AF) cannot be performed.

Note that PTL 2 (Japanese Patent Laid-open No. 2017-37103) discloses a configuration of controlling the position of a focus lens while taking the correspondence between a zoom position and the position of the focus lens position into consideration.

However, in the configuration disclosed in PTL 2, the output reliability of focusing point detecting means is determined, and, in the case where the reliability is low, position control of the focus lens is performed again by a different method. Thus, this configuration has a problem that the adjustment requires much time. This configuration cannot be used in a case where high-speed auto focusing (AF) is requested such as in consecutive shooting, for example.

CITATION LIST

Patent Literature

[PTL 1]
Japanese Patent Laid-open No. 2014-137468
[PTL 2]
Japanese Patent Laid-open No. 2017-037103

SUMMARY

Technical Problem

The present disclosure has been made in view of the aforementioned problems, for example, and an object thereof is to provide an interchangeable lens device, an imaging device, an imaging system, a method, and a program by which high-precision auto focus (AF) processing can be performed while a focus lens or a zoom lens is moving.

Solution to Problem

A first aspect of the present disclosure is an interchangeable lens device including
a memory that stores a cam curve representing a relationship between a position of a zoom lens and a position of a focus lens according to a subject distance, and
a control section that performs focus control by driving the focus lens.
The control section
transmits zoom lens position information indicating the position of the zoom lens and focus lens position information indicating the position of the focus lens to an imaging device, and
performs the focus control on the basis of subject distance information indicating a substance distance which is calculated by the imaging device with use of the zoom lens position information and the focus lens position information acquired from the control section, and on the basis of the cam curve.

Furthermore, a second aspect of the present disclosure is an imaging device including
a memory that stores a cam curve representing a relationship between a position of a zoom lens and a position of a focus lens according to a subject distance, and
a focus control section that calculates an in-focus position of the focus lens.
The focus control section
receives an input of pixel information regarding a detection information acquisition pixel, and calculates a defocus amount,
receives, from a connected interchangeable lens device, an input of multiple sets of lens position information regarding the focus lens and the zoom lens acquired at a predetermined time interval during an exposure time period of the detection information acquisition pixel,
detects points, on the cam curve, corresponding to the multiple sets of lens position information, and calculates a reference focus lens position by using the detected corresponding points on the cam curve, and
calculates subject distance information indicating a subject distance, by using the calculated reference focus lens position and the defocus amount.

Furthermore, a third aspect of the present disclosure is an imaging system including an interchangeable lens and an imaging device.

The interchangeable lens acquires lens position information regarding a focus lens and a zoom lens at a predetermined time interval during an exposure time period of a detection information acquisition pixel for use in calculation of a defocus amount, and outputs the lens position information to the imaging device, and the imaging device receives an input of pixel information regarding the detection information acquisition pixel, and calculates a defocus amount, calculates a reference focus lens position by using the lens position information inputted from the interchangeable lens, and calculates subject distance information indicating a subject distance, by using the calculated reference focus lens position and the defocus amount, and outputs the subject distance information to the interchangeable lens.

Furthermore, a fourth aspect of the present disclosure is a focus control method which is executed by an interchangeable lens device.

The interchangeable lens includes a memory that stores a cam curve representing a relationship between a position of a zoom lens and a position of a focus lens according to a subject distance, and a control section that performs focus control by driving the focus lens.

The method includes, by means of the control section, transmitting zoom lens position information indicating the position of the zoom lens and focus lens position information indicating the position of the focus lens to an imaging device, and performing the focus control on the basis of subject distance information indicating a subject distance which is calculated by the imaging device with use of the zoom lens position information and the focus lens position information acquired from the control section, and on the basis of the cam curve.

Furthermore, a fifth aspect of the present disclosure is a focus control method which is executed by an imaging device.

The imaging device includes a memory that stores a cam curve representing a relationship between a position of a zoom lens and a position of a focus lens according to a subject distance, and a focus control section that calculates an in-focus position of the focus lens.

The method includes, by means of the focus control section, receiving an input of pixel information regarding a detection information acquisition pixel, and calculating a defocus amount, receiving, from a connected interchangeable lens device, an input of multiple sets of lens position information regarding the focus lens and the zoom lens acquired at a predetermined time interval during an exposure time period of the detection information acquisition pixel, detecting points, on the cam curve, corresponding to the multiple sets of lens position information, and calculating a reference focus lens position by using the detected corresponding points on the cam curve, and calculating subject distance information indicating a subject distance by using the calculated reference focus lens position and the defocus amount.

Furthermore, a sixth aspect of the present disclosure is a program for causing an interchangeable lens device to perform focus control processing.

The interchangeable lens includes a memory that stores a cam curve representing a relationship between a position of a zoom lens and a position of a focus lens according to a subject distance, and a control section that performs focus control by driving the focus lens.

The program is for causing the control section to transmit zoom lens position information indicating the position of the zoom lens and focus lens position information indicating the position of the focus lens to an imaging device, and perform the focus control on the basis of subject distance information indicating a subject distance which is calculated by the imaging device with use of the zoom lens position information and the focus lens position information acquired from the control section, and on the basis of the cam curve.

Furthermore, a seventh aspect of the present disclosure is a program for causing an imaging device to perform focus control processing.

The imaging device includes a memory that stores a cam curve representing a relationship between a position of a zoom lens and a position of a focus lens according to a subject distance, and a focus control section that calculates an in-focus position of the focus lens.

The program is for causing the focus control section to execute reception of an input of pixel information regarding a detection information acquisition pixel, and calculation of a defocus amount, reception, from a connected interchangeable lens device, of an input of multiple sets of lens position information regarding the focus lens and the zoom lens acquired at a predetermined time interval during an exposure time period of the detection information acquisition pixel, detection of points, on the cam curve, corresponding to the multiple sets of lens position information, and calculation of a reference focus lens position by using the detected corresponding points on the cam curve, and calculation of subject distance information indicating a subject distance by using the calculated reference focus lens position and the defocus amount.

Note that a program according to the present disclosure can be provided by a recording medium or a communication medium for providing the program in a computer readable format to an information processing device or a computer system that is capable of executing various program codes, for example. Since such program is provided in a computer readable format, processing in accordance with the program is executed on the information processing device or the computer system.

Other objects, features, and advantages of the present disclosure will become apparent from the more detailed description based on the embodiments and the attached drawings of the present disclosure which are described later. Note that, in the present description, a system refers to a logical set structure including a plurality of devices, and the devices of the structure are not necessarily included in the same casing.

Advantageous Effect of Invention

With the configuration of one embodiment according to the present disclosure, a device and a method by which high-precision auto focus (AF) processing can be performed while a focus lens or a zoom lens is being operated, are implemented.

Specifically, for example, an interchangeable lens acquires position information regarding a focus lens and a zoom lens at a predetermined time interval during an exposure time period of a detection information acquisition pixel for use in calculation of a defocus amount (DF), and outputs the position information to an imaging device. The imaging device calculates a defocus amount (DF) by using the detection information acquisition pixel information, calculates a reference focus lens position (Ref_fc) by using points, on a cam curve, corresponding to the inputted lens position information, calculates a target focus lens position (Tgt_fc) in an in-focus position from the reference focus lens position (Ref_fc) and the defocus amount (DF), and outputs the target focus lens position (Tgt_fc) to the interchangeable lens.

With this configuration, a device and a method by which high-precision auto focus (AF) processing can be performed while a focus lens or a zoom lens is being operated, are implemented.

Note that the effects described in the present description are mere examples, and thus, are not limited. In addition, another effect may be provided.

BRIEF DESCRIPTION OF DRAWINGS

FIG. 3 is an explanatory diagram of an example of a pixel configuration in an imaging element having phase difference detection pixels.

FIG. 9 is an explanatory diagram of an example of storing cam curve data in the imaging system according to the present disclosure.

FIG. 12 is an explanatory diagram of an example of lens position information data which is used in the imaging system according to the present disclosure.

FIG. 14 is an explanatory diagram of calculation of a target focus lens position, which is executed by the imaging system according to the present disclosure.

DESCRIPTION OF EMBODIMENTS

Hereinafter, an interchangeable lens device, an imaging device, an imaging system, a method, and a program according to the present disclosure will be explained in detail with reference to the drawings. Note that explanations will be given in accordance with the following items.

1. Configuration Example of Interchangeable Lens Device, Imaging Device, and Imaging System
2. Specific Sequence Example of Auto Focus (AF) Processing
3. Problems Caused When AF Processing Is Performed with Focus Lens Being Driven
4. Auto Focus (AF) Processing in Which Zoom Position Is Taken into Consideration
5. Data Communication between Interchangeable Lens and Imaging Device (Body) and Process Sequence Thereof
6. Conclusion of Configuration According to Present Disclosure

[1. Configuration Example of Interchangeable Lens Device, Imaging Device, and Imaging System]

First, a configuration example of the interchangeable lens device, the imaging device, and the imaging system will be explained with reference to FIG. 1 and later.

Figure 1:
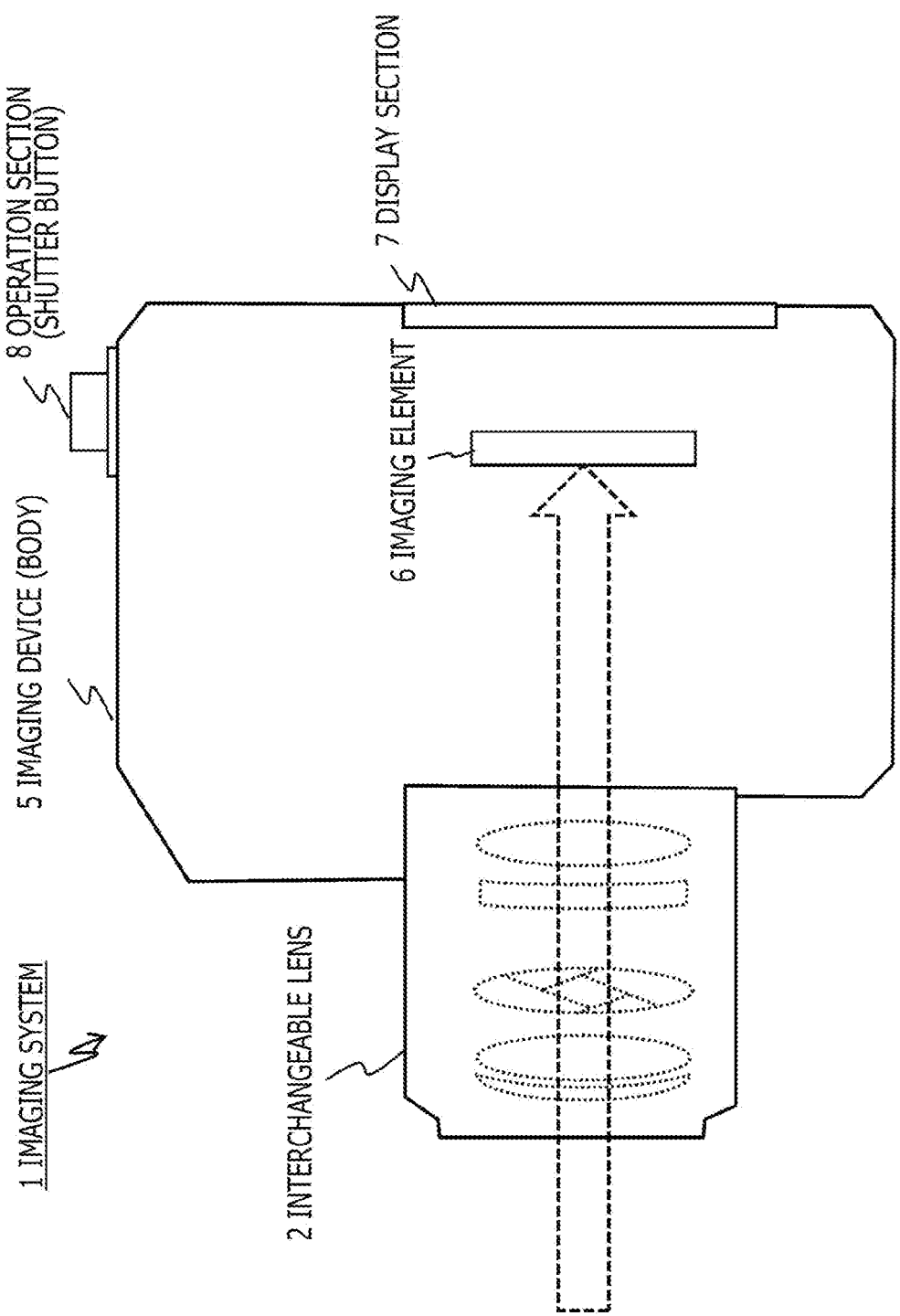
FIG. 1 is an explanatory diagram of a configuration example of an imaging system.

FIG. 1 is a diagram depicting one example of an imaging system 1.

The imaging system 1 includes an interchangeable lens 2 and an imaging device (body) 5.

The interchangeable lens 2 is a lens unit that can be attached to and detached from the imaging device (body) 5.

The interchangeable lens 2 incorporates various lenses including a focus lens and a zoom lens, further includes a driving section that drives the lenses and a control section that outputs a driving signal to the driving section, and further includes a mount section having a communication function and a connection function with respect to the imaging device (body) 5, and the like.

A specific configuration example of the interchangeable lens 2 will be explained later with reference to FIG. 2.

The imaging device (body) 5 includes an imaging element 6 that photographs a subject image incident via the interchangeable lens 2, a display section 7 that displays the image photographed by the imaging element 6, an operation section (shutter button) 8 for starting a photographing process, and the like.

Although not illustrated in the figure, a recording section that stores an image photographed by the imaging element 6, a signal processing section that performs image processing on the image photographed by the imaging element 6, a mount section that has a communication function and a connection function with respect to the interchangeable lens 2, and the like are included.

A specific configuration example of an imaging system including an imaging device and an interchangeable lens will be explained with reference to FIG. 2.

Figure 2:
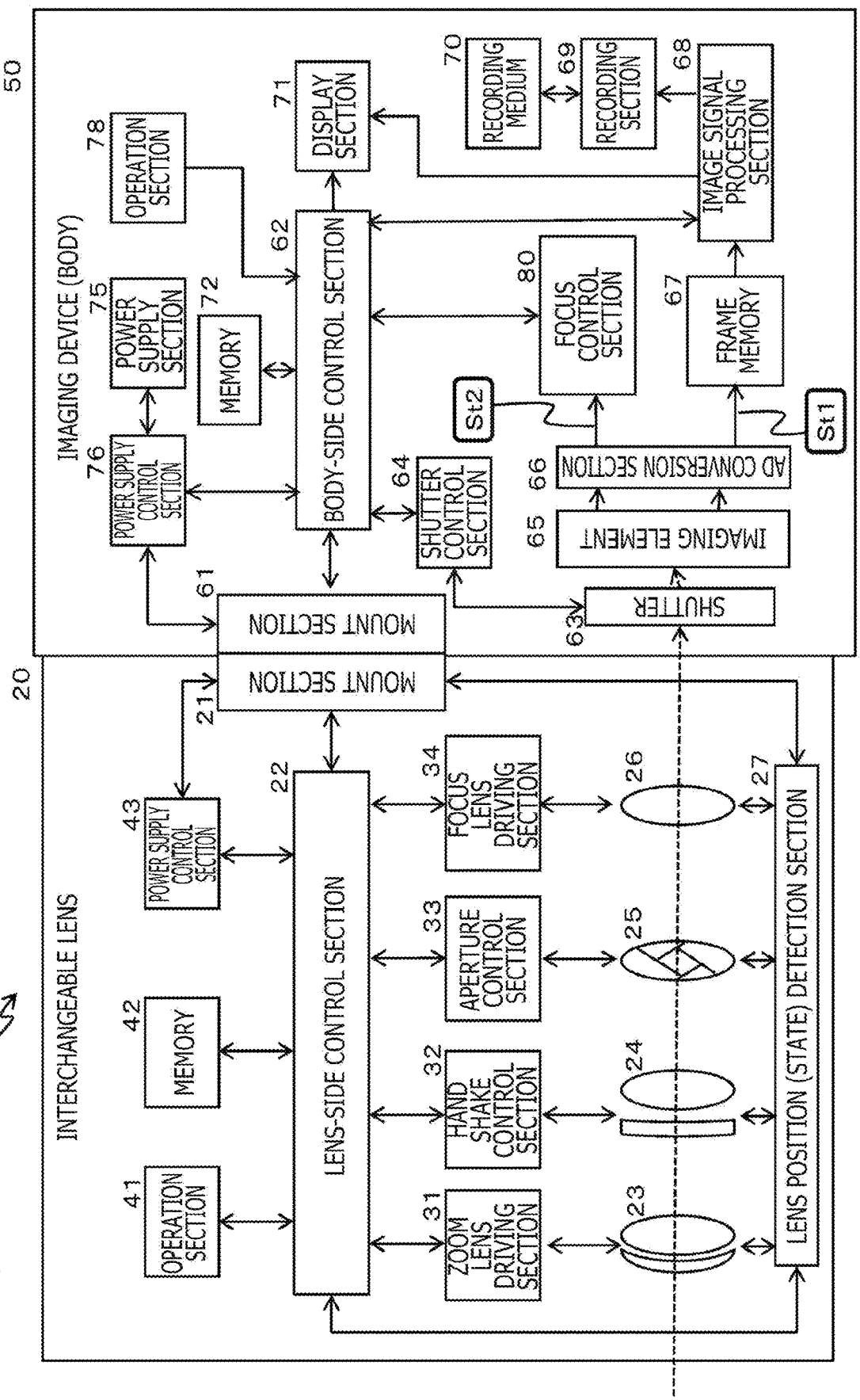
FIG. 2 is an explanatory diagram of a configuration example of an interchangeable lens and an imaging device (body) constituting the imaging system.

An imaging system 10 depicted in FIG. 2 includes an interchangeable lens 20 and an imaging device (body) 50. The imaging system 10, the interchangeable lens 20, and the imaging device (body) 50 correspond to the imaging system 1, the interchangeable lens 2, and the imaging device (body) 5 depicted in FIG. 1, respectively.

The imaging system 10 in FIG. 2 is a lens interchangeable type digital camera, and includes the interchangeable lens 20 that can be attached thereto and detached therefrom, and the imaging device (body) 50 serving as a camera main body side.

The interchangeable lens 20 includes a mount section 21 that is detachably attached to a mount section 61 of the imaging device (body) 50. The mount section 21 includes a plurality of terminals that is electrically connected to the imaging device (body) 50, and a communication section that communicates with the imaging device (body) 50.

Further, the interchangeable lens 20 includes a lens-side control section 22, a zoom lens 23, a hand shake correction lens 24, an aperture 25, a focus lens 26, an operation section 41, a memory 42, and a power supply control section 43.

Further, the interchangeable lens 20 includes a zoom lens driving section 31, a hand shake control section 32, an aperture control section 33, a focus lens driving section 34, and a lens position (state) detection section 27.

The lens-side control section 22 includes, for example, a computation processing unit such as a CPU (Central Processing Unit) or an MPU (Micro Processing Unit) and a peripheral circuit thereof, and controls the entire interchangeable lens 20 by reading out a predetermined control program stored in the memory 42 and executing the program.

Note that the lens-side control section 22 has a clock for measuring time information, and outputs synchronization signals to the processing sections, and thereby controls respective processing timings at the processing sections.

For example, the lens-side control section 22 controls the position of the zoom lens 23 in accordance with a command supplied from the imaging device (body) 50 via a predetermined communication terminal of the mount section 21 or a user's operation received through the operation section 41.

Specifically, the lens-side control section 22 acquires the current position of the zoom lens 23 from the lens position (state) detection section 27, which includes a magnetic sensor (MR sensor) or the like, for example, decides a driving direction and a driving amount for moving the zoom lens 23 to a predetermined position on the basis of the acquisition result, and outputs the decided driving direction and driving amount together with a movement command to the zoom lens driving section 31. On the basis of the movement command supplied from the lens-side control section 22, the zoom lens driving section 31 moves the zoom lens 23 in an optical axis direction so as to achieve the commanded driving direction and driving amount.

Moreover, the lens-side control section 22 controls the hand shake correction lens 24 to correct hand shakes. Specifically, the lens-side control section 22 decides, in a direction for canceling a hand shake amount, a driving direction and a driving amount for the hand shake correction lens 24 on the basis of the hand shake amount detected by a hand shake detection sensor incorporated in the lens position (state) detection section 27, and outputs the decided driving direction and driving amount together with a movement command to the hand shake control section 32. The hand shake detection sensor includes a gyro sensor and/or a triaxial acceleration sensor, for example. The gyro sensor is used to detect a deviation (shake) in a direction corresponding to Pitch or Yaw as the correction direction of the hand shake correction lens 24. The triaxial acceleration sensor is used to detect deviations (shakes) in directions which are defined as an X-axis and a Y-axis when the optical axis direction is defined as a Z-axis. On the basis of the movement command supplied from the lens-side control section 22, the hand shake control section 32 moves the hand shake correction lens 24 so as to achieve the commanded driving direction and driving amount.

The lens-side control section 22 performs control to mechanically lock the hand shake correction lens 24 in a case where power supply is turned off. In other words, in a state where power is being supplied from the imaging device (body) 50 to the interchangeable lens 20, the hand shake correction lens 24 is kept at a predetermined position under the control by the hand shake control section 32, but when the power supply is turned off, the position control by the hand shake control section 32 is stopped so that the hand shake correction lens 24 moves downward in a gravity direction by a predetermined amount. According to timing at which the power supply is turned off, the lens-side control section 22 prevents downward movement of the hand shake correction lens 24 by mechanical locking of the hand shake correction lens 24 via the hand shake control section 32. The hand shake control section 32 mechanically locks the hand shake correction lens 24 on the basis of a fixation command supplied from the lens-side control section 22.

The lens-side control section 22 controls (the aperture diameter of) the aperture 25 in accordance with a command, etc., supplied from the imaging device (body) 50 via a predetermined communication terminal of the mount section 21. Specifically, the lens-side control section 22 acquires an aperture diameter of the aperture 25 detected by an aperture detection sensor (not illustrated), and instructs the aperture control section 33 to obtain an F value according to the command from the imaging device (body) 50 such that the aperture 25 is driven. The aperture control section 33 drives the aperture 25 to have the aperture diameter according to a command from the lens-side control section 22.

Further, the lens-side control section 22 controls the focus lens 26. Specifically, the lens-side control section 22 acquires the current position of the focus lens 26 from the lens position (state) detection section 27, decides a driving direction and a driving amount for moving the focus lens 26 to a predetermined position on the basis of the acquisition result, and outputs the decided driving direction and driving amount together with a movement command to the focus lens driving section 34. The focus lens driving section 34 moves the focus lens 26 in the optical axis direction such that the driving direction and the driving amount according to the command are obtained. The focus lens 26 includes one or more optical elements. Note that the focus lens 26 may be configured by two focus lens groups: a focus lens group on a side close to the zoom lens 23; and a focus lens group on a side close to an imaging element 65 of the imaging device (body) 50.

The lens position (state) detection section 27 can include, for example, a magnetic sensor, a photodiode array, a potentiometer, a reflection-type optical encoder, or the like.

The focus lens driving section 34 can include, for example, an ultrasonic motor, a DC motor, a linear actuator, a stepping motor, a piezo element (piezoelectric element), or the like.

The lens-side control section 22 performs various types of control in accordance with a command supplied from the imaging device (body) 50 via a predetermined communication terminal of the mount section 21 or a user's operation received through the operation section 41.

The operation section 41 corresponds to a zoom ring for manually setting a zooming magnification, a focus ring for manually setting a focus lens, or the like, receives a user's manual operation, and supplies an operation signal corresponding to the received operation to the lens-side control section 22.

The memory 42 is a storage section including a RAM (Random Access Memory), a ROM (Read Only Memory), or the like, for example, and stores various types of data such as a control program, storage regions of various types of data being operated, a predetermined control program which is executed by the lens-side control section 22, and adjustment parameters.

The power supply control section 43 detects the power amount of power supplied from the imaging device (body) 50, and supplies power to the sections (lens-side control section 22 and various driving sections) of the interchangeable lens 20 by respective optimally allocated power amounts on the basis of the detected power amount.

On the other hand, the imaging device (body) 50 serving as a body side includes the mount section 61 to which the interchangeable lens 20 is detachably attached. The mount section 61 includes a plurality of terminals that is electrically connected to the mount section 21 of the interchangeable lens 20, and a communication section that communicates with the interchangeable lens 20.

When the interchangeable lens 20 is attached to the mount section 61 of the imaging device (body) 50, the terminals of the mount section 61 are electrically and physically connected to corresponding terminals of the mount section 21 of the interchangeable lens 20. The terminals for connection include a terminal for power supply (a power supply terminal), a terminal for transmitting commands or data (a communication terminal), a terminal for transmitting synchronization signals (a synchronization signal terminal), and the like, for example.

The imaging device (body) 50 further includes a body-side control section 62, a shutter 63, a shutter control section 64, the imaging element 65, an AD conversion section 66, a frame memory 67, an image signal processing section 68, a recording section 69, a recording medium 70, a display section 71, a memory 72, a power supply section 75, a power supply control section 76, an operation section 78, and a focus control section 80.

The body-side control section 62 includes, for example, a computation processing unit such as a CPU (Central Processing Unit) or an MPU (Micro Processing Unit) and a peripheral circuit thereof, etc., and reads out and executes a predetermined control program recorded in the memory 72, and thereby controls a process which is executed by the imaging device (body) 50 and overall processes in the imaging system 10.

Note that the body-side control section 62 includes a clock for measuring time information, and outputs synchronization signals to the processing sections, for example, and thereby controls the timings of processes which are executed at the respective processing sections.

The memory 72 is a storage section including a RAM (Random Access Memory), a ROM (Read Only Memory), or the like, for example, and stores various types of data such as a control program, storage regions of various types of data being operated, a predetermined control program which is executed by the body-side control section 62, and adjustment parameters.

For example, the body-side control section 62 causes the imaging element 65 to execute imaging on the basis of an operation signal indicating a predetermined user's operation supplied from the operation section 78. Further, the body-side control section 62 drives the focus lens 26 and the zoom lens 23, etc., by transmitting a predetermined command to the interchangeable lens 20 via the mount section 61.

In addition, for example, lens position information regarding the focus lens 26 and zoom position information regarding the zoom lens 23, etc. are supplied from the interchangeable lens 20 to the body-side control section 62 via the mount section 61 so that, at an optimum timing based on the information, the body-side control section 62 causes the imaging element 65 to capture an image that is to be recorded in the recording section 69 or capture an image that is to be transmitted to an external device. The (data of) image obtained by the imaging element 65 is recorded (stored) in the recording medium 70 via the recording section 69 under control by the body-side control section 62, and is further displayed on the display section 71.

The shutter 63 is disposed on a front surface of the imaging element 65, and is opened and closed under control by the shutter control section 64. When the shutter 63 is in a closed state, light of a subject having passed through the optical system of the interchangeable lens 20 is blocked. The shutter control section 64 detects the open/closed state of the shutter 63, and supplies the state to the body-side control section 62. The shutter control section 64 drives the shutter 63 to an open state or a closed state under control by the body-side control section 62.

The imaging element 65 includes a CCD (Charge Coupled Device) or a CMOS (Complementary Mental Oxide Semiconductor) sensor, for example, generates image data by imaging a subject, and outputs the image data.

In a case where the imaging element 65 includes a CCD sensor or a CMOS sensor, an electric shutter can be used. Accordingly, the shutter 63 may be omitted. In a case where the shutter 63 is omitted, the shutter control section 64, which is used for controlling the shutter 63, is also omitted.

Note that the imaging element 65 includes image photographing pixels (RGB pixels), and detection information acquisition pixels which are used for auto focus processing, i.e., phase difference detection pixels for acquiring phase difference information.

A specific example of the pixel configuration in the imaging element 65 will be explained with reference to FIG. 3.

Figure 3:
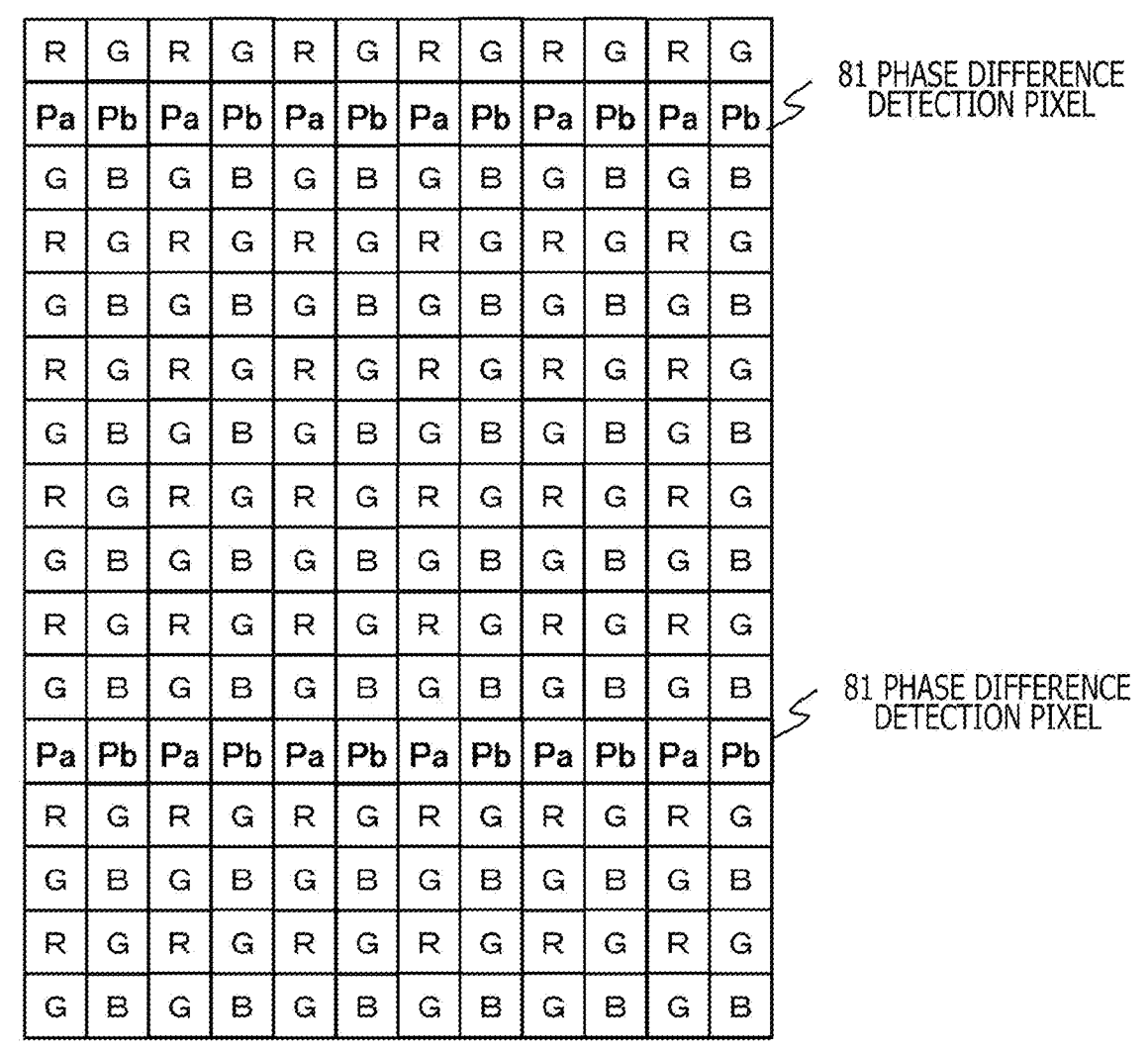

FIG. 3 is a diagram depicting an example of the pixel configuration in the imaging element 65. The Y-axis represents the up-down direction, and the X-axis represents the left-right direction. In FIG. 3, each square represents one pixel.

RGB pixels depicted in FIG. 3 are normal image photographing pixels. The RGB pixels have a Bayer array configuration, for example.

Detection information acquisition pixels which are used for auto focus processing, i.e., phase difference detection pixels 81 for acquiring phase difference information, are discretely set in portions (lines) of the RGB pixels having the Bayer array.

The phase difference detection pixels include pairs each including a right aperture phase difference detection pixel Pa and a left aperture phase difference detection pixel Pb.

The imaging element 65 separately performs the following two data output processes:

(1) output of pixel information (image signal) by pixels (RGB pixels) for photographed images; and (2) output of phase difference detection pixel information ((AF) detection signal) by the phase difference detection pixels 81.

The "(1) output of pixel information (image signal) by pixels (RGB pixels) for photographed images" is made in accordance with an image photographing timing given by a user (photographing person). Further, a display image (live-view image) to be displayed on the display section 71 is outputted even during a non-photographing time. The display image (live-view image) is outputted at a frame rate corresponding to the image display rate of the display section 71.

The "(2) output of phase difference detection pixel information (detection signal) by the phase difference detection pixels 81" is made at an interval shorter than an image outputting interval, or at a (1/60)-sec (=16.7 msec) interval, for example.

As depicted in FIG. 2, output from the imaging element 65 is inputted to the AD conversion section 66, and is converted to a digital signal.

The "(1) output of pixel information (image signal) by pixels (RGB pixels) for photographed images" is inputted to the AD conversion section 66, is converted to a digital signal, is stored in the frame memory 67, and is then inputted to the image signal processing section 68.

The image signal processing section 68 performs, for example, general camera signal processing such as white balance (WB) adjustment and gamma correction, and thereby generates an output image, that is, an image to be displayed on the display section 71 or an image to be recorded in the recording medium 70.

In FIG. 2, this data stream is indicated by a stream 1 (St1).

On the other hand, the "(2) output of phase difference detection pixel information (detection signal) by the phase difference detection pixels 81" is inputted to the AD conversion section 66, is converted to a digital signal, and is then inputted to the focus control section 80.

The focus control section 80 analyzes the phase difference between a pair of images generated from the phase difference detection pixel information (detection signal), and thereby calculates a focus deviation amount to a subject (focus target) which is a target to be focused, that is, the deviation amount (defocus amount (DF)) between the in-focus distance and the subject distance.

In FIG. 2, a data stream corresponding to the "(2) output of phase difference detection pixel information (detection signal) by the phase difference detection pixels 81" is indicated by a stream 2 (St2).

In this manner, the two data streams are outputted from the imaging element 65.

These two streams are outputted at separate timings independent of each other.

An example of a detailed output sequence of the two data sets will be explained later.

The image signal processing section 68 performs predetermined image signal processing on an image supplied from the imaging element 65. For example, the image signal processing section 68 converts a RAW image supplied from the imaging element 65 into image data in a predetermined file format, and records the image data in the recording medium 70 via the recording section 69. In addition, the image signal processing section 68 performs demosaic processing on the RAW image, and further, performs reversible compression or irreversible compression thereon to convert the image to image data in a predetermined file format, and records the image data in the recording medium 70 via the recording section 69. Moreover, for example, the image signal processing section 68 converts the image data supplied from the imaging element 65, to an image signal in a predetermined display format, and supplies the image signal to the display section 71 to display a captured image.

The recording section 69 causes the recording medium 70 including a nonvolatile memory, for example, to record (store) image data or the like captured by the imaging element 65. Further, the recording section 69 performs control to read out the image data from the recording medium 70. The recording medium 70 may be attachable and detachable.

The display section 71 includes a panel-type display unit such as a liquid crystal panel or an organic EL display, and displays an image (video image or still image) supplied from the image signal processing section 68. The display section 71 is mounted on a rear surface opposite to a front surface on which the mount section 61 is disposed, and can display a through image or an image recorded in the recording medium 70, for example.

The power supply control section 76 supplies power supplied from the power supply section 75, to the sections of the imaging device (body) 50. In addition, the power supply control section 76 calculates a power amount of power that can be supplied to the interchangeable lens 20 while taking the operation state of the imaging device (body) 50 into consideration, and supplies power to the interchangeable lens 20 via the mount section 61. For example, the power supply section 75 includes, for example, a secondary battery such as a NiCd battery, a NiMH battery, or a Li battery, an AC adaptor, or the like.

The operation section 78 includes hardware keys such as a shutter button, a mode dial, and a zoom button, and software keys on a touch panel layered on the display section 71, receives a predetermined operation performed by the user, and supplies an operation signal thereof to the body-side control section 62. The user can set a photographing mode or set a camera parameter, for example, by operating the operation section 78.

As described above, the focus control section 80 receives an input of phase difference detection pixel information (AF detection signal) for performing auto focus (AF) processing via the imaging element 65 and the AD conversion section 66.

The focus control section 80 analyzes the inputted AF detection signal, and calculates the defocus amount (DF) which is necessary for auto focus (AF) processing.

Specifically, the deviation amount (defocus amount (DF)) between the in-focus distance and the subject distance is calculated through analysis of the inputted AF detection signal so that a target focus lens position (Tgt_fc), which is a lens position for obtaining an in-focus state of the focus lens 26 on the interchangeable lens 20 side, is decided.

Note that, in an embodiment which will be explained below, the imaging system 10 depicted in FIG. 2 is assumed to perform auto focus (AF) processing using a phase difference detection scheme.

In the AF processing using the phase difference detection scheme, light having passed through a lens is pupil-split to generate a pair of images, and the focus position (in-focus position) is detected through analysis of the phase difference between the pair of images generated.

Note that, as described above, detection of a focus position (in-focus position) by the phase difference detection scheme, is disclosed in PTL 1 (Japanese Patent Laid-open No. 2014-137468) and the like, for example.

Also in the imaging system according to the present disclosure, processing using a defocus amount calculated by the phase difference detection scheme is performed.

Note that the processing according to the present disclosure is not limited to the phase difference detection scheme, and is applicable to a configuration using other auto focus processing.

The focus control section 80 calculates the focus deviation amount (defocus amount) of an object (focus target) to be focused, on the basis of the AF detection signal inputted via the imaging element 65 and the AD conversion section 66, that is, a phase difference detection pixel output value, and calculates a target position (Tgt_fc) of the focus lens 26 necessary for focusing, on the basis of the calculated defocus amount.

The calculated target position (Tgt_fc) of the focus lens 26 is outputted to the interchangeable lens 20 via the body-side control section 62 and the mount section 61.

The interchangeable lens 20 drives the focus lens 26 through processing at the lens-side control section 22 and the focus lens driving section 34 in accordance with the inputted target position (Tgt_fc), and thereby performs processing for focusing on a subject.

Note that, in focus control processing (focus processing) according to the present disclosure, which will be explained below, the processing is performed by use of various types of data indicating positions or distances.

These terms will be explained.

(a) Subject distance: A subject distance refers to an actual distance from an imaging device to a subject to be photographed, or an actual distance such as 2 m, 3 m, . . . , or 7 m, for example, and is also referred to as an in-focus distance.

(b) In-focus position: An in-focus position refers to a lens position within a lens movement frame (lens driving stroke) that obtains focusing on a subject, unlike the in-focus distance (=subject distance) described above. For example, the in-focus position is expressed by coordinates based on a reference point as an original point set within the lens movement frame (lens driving stroke), or by a separation distance (mm) from the original point. Note that the lens movement frame refers to a region in which the lens can move and which is formed in the interchangeable lens.

(c) Focus lens position: A focus lens position refers to the position of the focus lens within the lens movement frame (lens driving stroke). Similarly to the in-focus position, the focus lens position is expressed by coordinates based on a reference point as an original point set within the lens movement frame (lens driving stroke), or by a separation distance (mm) from the original point.

(d) Zoom lens position: A zoom lens position refers to the position of the zoom lens within the lens movement frame (lens driving stroke). Similarly to the in-focus position, the zoom lens position is expressed by coordinates based on a reference point as an original point set within the lens movement frame (lens driving stroke), or by a separation distance (mm) from the original point.

(e) Target focus lens position: A target focus lens position (Tgt_fc) refers to information indicating the "(a) subject distance" for obtaining an in-focus state, or the "(c) focus lens position" for focusing on a subject.

Note that, in one example of the processing according to the present disclosure, the target focus lens position is decided by use of a cam curve, and is used as a focus lens movement control command value to be outputted from the imaging device (body) 50 to the interchangeable lens 10.

(f) Subject distance information: Subject distance information is a generic term for information that can be applied for focusing processing, and is at least the aforementioned (a) subject distance and/or position information such as the (c) focus lens position and the (d) zoom lens position in the in-focus position. The (e) target focus lens position described above is also included in the subject distance information.

[2. Specific Sequence Example of Auto Focus (AF) Processing]

Next, a specific sequence example of auto focus (AF) processing will be explained.

Figure 4:
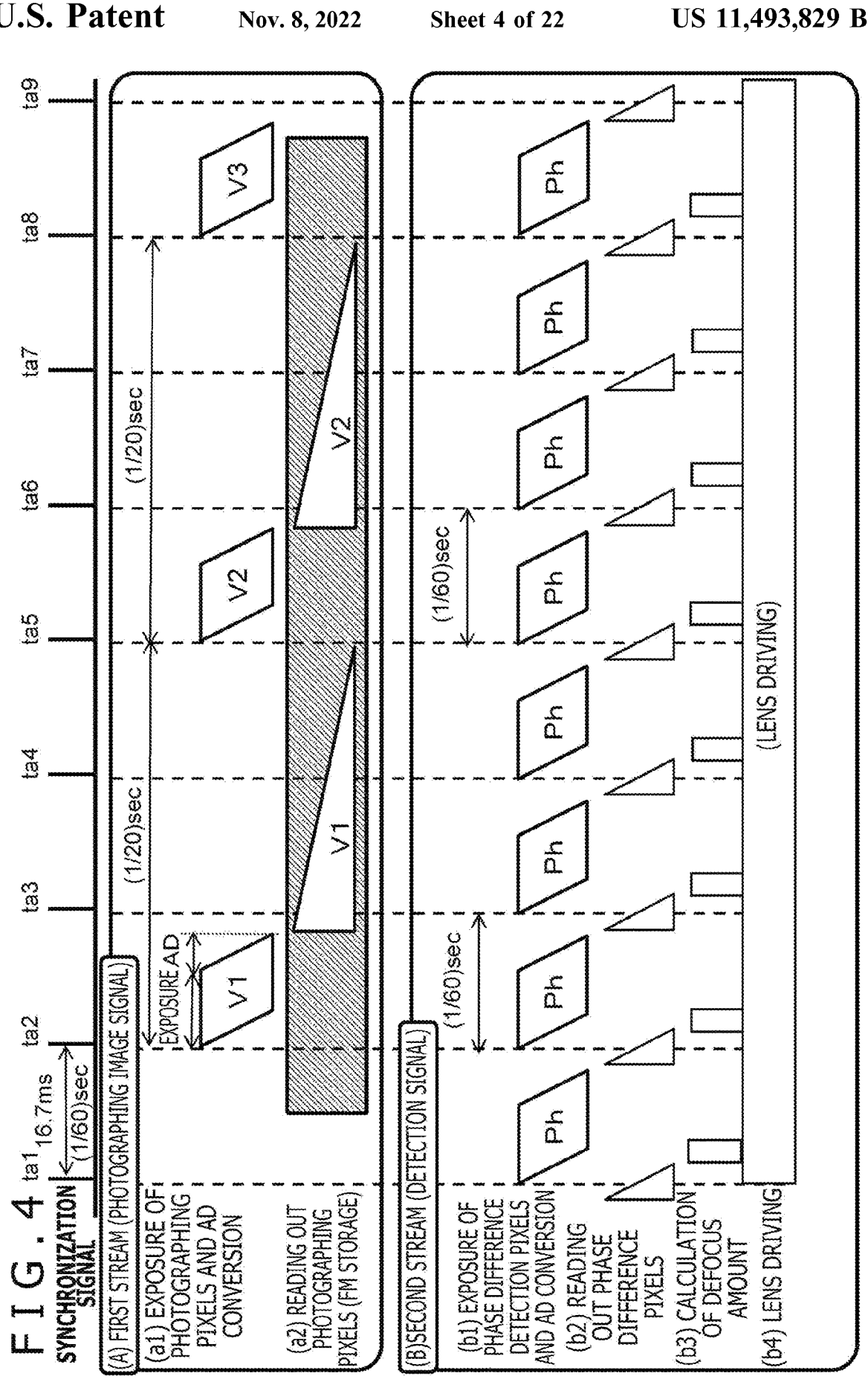
FIG. 4 is an explanatory diagram of an example of an imaging sequence.

FIG. 4 is a diagram depicting one example of a data output sequence of the imaging element 65 of the imaging device (body) 50 side in the imaging system 10 having been explained with reference to FIG. 2.

As explained above with reference to FIG. 2, the following two data streams are separately outputted from the imaging element 65:

(First stream) Output of pixel information (image signal) by photographing image pixels (RGB pixels); and (Second stream) Output of phase difference detection pixel information ((AF) detection signal) by the phase difference detection pixels 81.

FIG. 4 depicts an example of two signal processing sequences:

(A) process sequence for the first stream (photographing image signal); and (B) process sequence for the second stream (detection signal).

Note that the (A) process sequence for the first stream (photographing image signal) depicted in the upper stage in FIG. 4 is a process sequence example in a case where consecutive shooting of still images is carried out.

Still images V1, V2, and V3 in FIG. 4 are obtained by consecutive shooting.

High-speed and high-precision auto focus (AF) processing is required in consecutive shooting.

In the top stage in FIG. 4, synchronization signals (ta1, . . . ) for controlling the timings of various processes in the imaging device (body) 50 are depicted.

In the example depicted in FIG. 4, the synchronization signals are given at a 16.7-ms (=(1/60) sec) interval. The synchronization signals are provided from the body-side control section 62 to the processing sections, for example, and each serve as a trigger for a timing to perform processing at each of the processing sections.

First, the (A) process sequence for the first stream (photographing image signal) in FIG. 4 will be explained.

The (A) process sequence for first stream (photographing image signal) in FIG. 4 includes two processes:

(a1) exposure of photographing pixels and AD conversion; and (a2) reading out photographing pixels (frame memory (FM) storage).

The (a1) exposure of photographing pixels and AD conversion refer to exposure in the imaging element 65 and AD conversion in the AD conversion section 66.

FIG. 4 depicts a consecutive shooting example, and depicts a sequence in a case where still images (V1, V2, V3, . . . ) are taken at a (1/20)-sec interval.

As depicted in (a1), exposure of the first image V1 in the consecutive shooting is started in the imaging element 65 at time ta2, the exposure is performed for a predetermined period of time, the exposure result is outputted from the imaging element 65 to the AD conversion section 66, and then, AD conversion is performed on the exposure result.

Note that the right-downward parallelogram shapes mean that the output from the imaging element 65 to the AD conversion section 66 and the AD conversion are sequentially performed on the pixels constituting the imaging element 65, downwardly from an upper pixel to a lower pixel.

When exposure and AD conversion on one image such as the image V1 are completed, storage from the AD conversion section 66 into the frame memory 67 is performed.

This process is the (a2) reading out photographing pixels (frame memory (FM) storage) depicted in FIG. 4.

The triangular region of the image V1 depicted in (a2) of FIG. 4 means that data is transferred and stored from the AD conversion section 66 into the frame memory 67 pixel by pixel, and thus, certain time is required until the storage is completed. In the depicted example, storage of the image V1 into a frame memory is started immediately before time ta3, and is completed at time ta5.

Next, the (B) process sequence for the second stream (detection signal) depicted in the lower stage in FIG. 4 will be explained.

The (B) process sequence for the second stream (detection signal) depicted in the lower stage in FIG. 4 concerns pixel signals of the phase difference detection signals 81 formed in the imaging element 65.

In the (B) process sequence for the second stream (detection signal) depicted in FIG. 4, four processes:

(b1) exposure of phase difference detection pixels and AD conversion;
(b2) reading out phase difference pixels;
(b3) calculation of a defocus amount; and
(b4) lens driving are depicted.

The (b1) exposure of phase difference detection pixels and AD conversion refer to exposure of the phase difference detection pixels in the imaging element 65 and AD conversion in the AD conversion section 66.

The exposure of the phase difference detection pixels and AD conversion in the AD conversion section 66 are performed independently of the (1) process for the first stream (photographing image signal) depicted in the upper stage in FIG. 4.

In the depicted example, exposure of phase difference detection pixels is performed at a (1/60)-sec interval.

Each Ph in the drawing indicates exposure of phase difference detection pixels and AD conversion which are performed at a (1/60)-sec interval.

After the exposure of phase difference detection pixels depicted in (b1) of FIG. 4, a pixel value of the difference detection pixels having been converted to digital data, is outputted from the AD conversion section 66 to the focus control section 80.

The processes depicted in FIG. 4:
(b2) reading out phase difference pixels; and
(b3) calculation of a defocus amount, are performed on the digital data by the focus control section 80.

In FIG. 4, each process is indicated by a triangular shape or a rectangular shape.

The exposure result of phase difference detection pixels is inputted to the AD conversion section 66, is converted to a digital signal, and is then inputted from the AD conversion section 66 to the focus control section 80.

In the configuration depicted in FIG. 2, the focus control section 80 sequentially receives, from the AD conversion section 66, an input of an AD-converted phase difference detection pixel value, in the order from that of an upper pixel to that of a lower pixel.

This process corresponds to the (b2) reading out phase difference pixels.

Note that FIG. 2 depicts a configuration in which an output from the AD conversion section 66 is directly inputted to the focus control section 80, but a configuration in which a memory is disposed between the focus control section 80 and the AD conversion section 66 such that an output from the AD conversion section 66 is stored in the memory, and is then inputted to the focus control section 80 via the memory, may be adopted.

As described above, the focus control section 80 analyzes the phase difference between a pair of images generated by phase difference detection pixels, and thereby calculates the focus deviation amount (defocus amount (DF)) to a subject (focus target) which is a target to be focused.

This process corresponds to the (b3) calculation of a defocus amount depicted in FIG. 4.

As seen from FIG. 4, the exposure of the phase difference detection pixels is performed at a (1/60)-sec interval, and the calculation of a defocus amount (DF) by the focus control section 80 is also performed at a (1/60)-sec interval.

The defocus amount (DF) calculated by the focus control section 80 corresponds to the difference between the target focus lens position (Tgt-fc) which corresponds to an in-focus position for a subject, and the current focus lens position (Cur_fc) which corresponds to the current position of the focus lens.

The body-side control section 62 of the imaging device (body) 50 outputs, to the interchangeable lens 20, either information regarding the defocus amount (DF) calculated by the focus control section 80, or information regarding the target focus lens position (Tgt-fc) obtained from the defocus amount (DF).

On the basis of either the information regarding the defocus amount (DF) or the information regarding the target focus lens position (Tgt-fc) inputted from the imaging device (body) 50, the lens-side control section 22 of the interchangeable lens 20 causes the focus lens driving section 34 to perform lens driving to drive the focus lens 26 to the target focus lens position (Tgt-fc).

This process corresponds to the (b4) lens driving depicted in FIG. 4.

The (B) process sequence for the second stream (detection signal) in FIG. 4 includes the following processes:
(b1) exposure of phase difference detection pixels and AD conversion;
(b2) reading out phase difference pixels;
(b3) calculation of a defocus amount; and
(b4) lens driving.

These four processes are performed every (1/60) sec which is equal to the interval of exposure of phase difference detection pixels.

[3. Problems Caused when AF Processing is Performed with Focus Lens being Driven]

Next, problems caused when AF processing is performed with a focus lens being driven, will be explained.

In order to perform auto focus (AF) processing at high speed, it is effective to perform the processing while driving a focus lens without stopping the focus lens.

However, when such processing is performed, proper processing cannot be performed in some cases.

Specifically, it is unclear at which position the focus lens is located when phase difference detection pixel information (AF detection signal), which is adopted as a parameter for calculating a defocus amount (DF) to be calculated by the focus control section 80, is obtained. This causes a problem that high-precision auto focus (AF) is difficult.

Hereinafter, this problem will be explained.

An example of calculating the defocus amount (DF) on the basis of the phase difference detection pixel information (AF detection signal) outputted from the imaging element 65, will be explained with reference to FIGS. 5 and 6.

Figure 5:
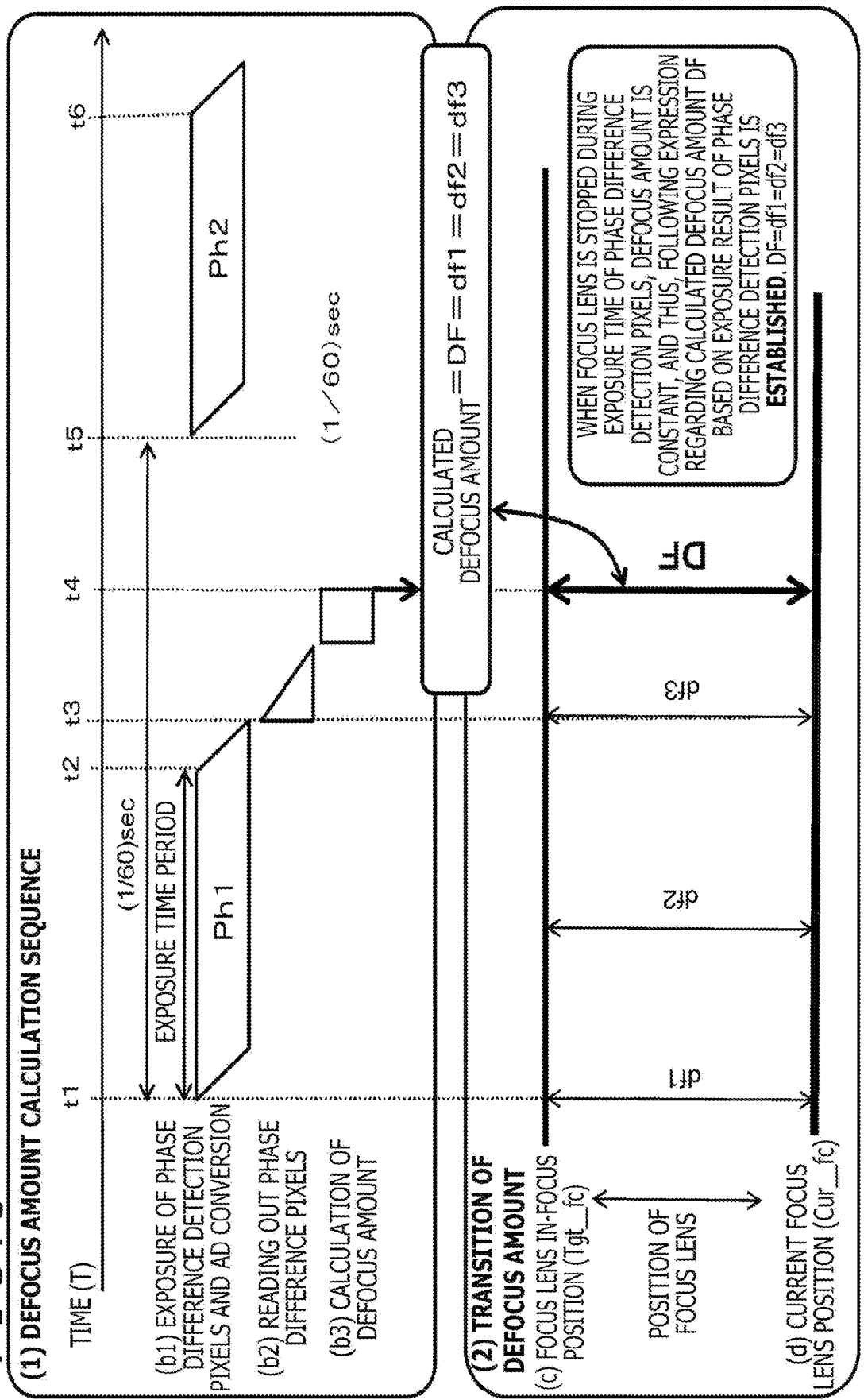
FIG. 5 is an explanatory diagram of an example of calculation of a defocus amount.

FIG. 5 depicts an example of calculating the defocus amount (DF) on the basis of the difference detection pixel information (AF detection signal) outputted from the imaging element 65 in a state where driving of a focus lens is stopped.

Figure 6:
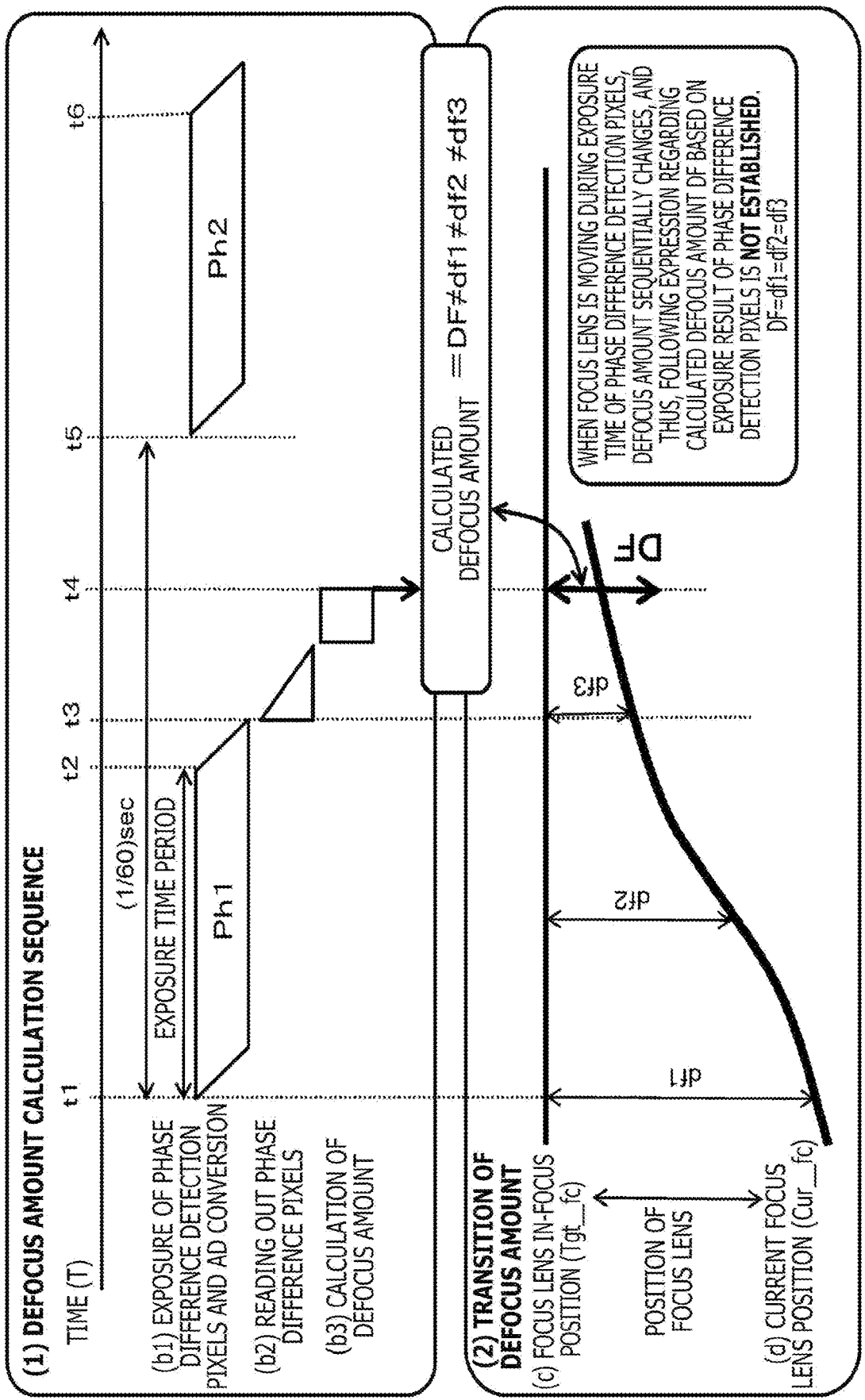
FIG. 6 is an explanatory diagram of an example of calculation of a defocus amount.

On the other hand, FIG. 6 depicts an example of calculating the defocus amount (DF) on the basis of the difference detection pixel information (AF detection signal) outputted from the imaging element 65 while a focus lens is being driven.

Note that, in both the examples, the processing is performed under a condition that a subject does not move.

First, the example of calculating the defocus amount (DF) on the basis of the difference detection pixel information (AF detection signal) outputted from the imaging element 65 in a state where driving of the focus lens is stopped, will be explained with reference to FIG. 5.

In FIG. 5, two diagrams:

(1) defocus amount calculation sequence; and (2) transition of a defocus amount, are depicted in association with each other along a time axis.

As indicated by a time axis (T) in (1) of FIG. 5, time elapses from left to right.

The diagram of the (1) defocus amount calculation sequence in FIG. 5 is obtained by enlarging a part of the (B) process sequence for the second stream (detection signal) in FIG. 4, which has been explained above with reference to FIG. 4. Similarly to (B) in FIG. 4, three processes:

(b1) exposure of phase difference detection pixels and AD conversion;

(b2) reading out phase difference pixels; and (b3) calculation of a defocus amount, are depicted.

In (1) of FIG. 5, as the (b1) exposure of phase difference detection pixels and AD conversion, two processes Ph1 and Ph2 which are performed at a (⅟60)-sec interval, are depicted.

The first exposure of phase difference detection pixels and AD conversion, which are denoted by Ph1, are started at time t1. The exposure is completed at time t2, the AD conversion is performed at time t2, and then, the AD conversion is completed at time t3. After time t3, the focus control section 80 performs (b2) reading out phase difference pixels, and (b3) calculation of a defocus amount.

At time t4, the "(b3) calculation of a defocus amount" is completed by the focus control section 80.

On the other hand, the lower stage in FIG. 5 depicts (2) transition of a defocus amount.

The time axis therefor is in accordance with the time axis depicted in (1) of FIG. 5.

In (2) of FIG. 5, the following lines:

(c) a focus lens in-focus position, that is, a target focus lens position (Tgt_fc); and (d) the current focus lens position, that is, a current focus lens position (Cur_fc), are depicted along the time axis.

The vertical direction in (2) of FIG. 5 indicates the movable direction of the focus lens. Focus adjustment is performed by upwardly/downwardly moving the focus lens.

Auto focus (AF) processing, that is, focusing processing is accomplished by moving the current focus lens position (Cur_fc) to the target focus lens position (Tgt_fc).

FIG. 5 depicts a process example of calculating the defocus amount (DF) on the basis of the phase difference detection pixel information (AF detection signal) outputted from the imaging element 65 in the state where driving of the focus lens is stopped.

Therefore, the (d) current focus lens position, that is, the current focus lens position (Cur_fc), indicated in the (2) transition of defocus in FIG. 5 is fixed without varying with the elapse of time.

At start time t1 of the first exposure of phase difference detection pixels and AD conversion denoted by Ph1 in the (1) defocus amount calculation sequence on the upper stage in FIG. 5, the defocus amount is df1.

Note that the defocus amount is the difference between the target focus lens position (Tgt_fc) and the current focus lens position (Cur_fc).

Also, at time t3 when the AD conversion denoted by Ph1 in (1) of FIG. 5 is completed, the defocus amount is df3.

In FIG. 5, a defocus amount df2 at one certain time between time t1 to time t3 is also depicted.

During any of these times, the current focus lens position, that is, the current focus lens position (Cur_fc), does not change. Under the condition that a subject does not move, the defocus amount does not change during the period of time t1 to time t3.

In other words, an expression:

$$df1=df2=df3$$

is established.

Thus, when the focus lens is stopped during the exposure time period of the phase difference detection pixels, the defocus amount is constant. Also for the defocus amount (DF) calculated by the focus control section 80 on the basis of the exposure result of the phase difference detection pixels, an expression:

$$DF=df1=df2=df3$$

is established.

In other words, the defocus amount (DF) calculated by the focus control section 80 on the basis of the exposure result of phase difference detection pixels is a precise defocus amount (DF) that is equal to the difference between the target focus lens position (Tgt_fc) and the current focus lens position (Cur_fc). By use of this defocus amount (DF), the focus lens is moved toward the target focus lens position (Tgt_fc) so that focusing processing, that is, proper auto focus (AF) processing can be performed.

Next, an example of calculating the defocus amount (DF) on the basis of the phase difference detection pixel information (AF detection signal) outputted from the imaging element 65 while driving the focus lens, will be explained with reference to FIG. 6.

Similarly to FIG. 5, FIG. 6 depicts two diagrams:

(1) defocus amount calculation sequence; and (2) transition of a defocus amount, in association with each other along a time axis.

As indicated by a time axis (T) in (1) of FIG. 6, time elapses from left to right.

As in FIG. 5, the diagram of the (1) defocus amount calculation sequence in FIG. 6 depicts three processes:

(b1) exposure of phase difference detection pixels and AD conversion;

(b2) reading out phase difference pixels; and (b3) calculation of a defocus amount.

The process timings of the three processes are identical to those in (1) of FIG. 5 explained above.

The first exposure of phase difference detection pixels and AD conversion, which are denoted by Ph1, are started at time t1. The exposure is completed at time t2, the AD conversion is performed at time t2, and then, the AD conversion is completed at time t3. After time t3, the focus control section 80 performs (b2) reading out phase difference pixels, and (b3) calculation of a defocus amount.

At time t4, the "(b3) calculation of a defocus amount" is completed by the focus control section 80.

The lower stage in FIG. 6 depicts (2) transition of a defocus amount.

The time axis therefor is in accordance with the time axis depicted in (1) of FIG. 6.

In (2) of FIG. 6, the following lines are depicted along the time axis:

(c) a focus lens in-focus position, that is, a target focus lens position (Tgt_fc); and (d) the current focus lens position, that is, a current focus lens position (Cur_fc), as in (2) of FIG. 5.

The vertical direction in (2) of FIG. 6 indicates the movable direction of the focus lens. Focus adjustment is performed by upwardly/downwardly moving the focus lens.

FIG. 6 depicts a process example of calculating the defocus amount (DF) on the basis of the phase difference detection pixel information (AF detection signal) outputted from the imaging element 65 while driving the focus lens. When such processing is performed, higher-speed AF processing (focusing processing) can be expected.

Therefore, the (d) current focus lens position, that is, the current focus lens position (Cur_fc), depicted in (2) transition of a defocus amount of FIG. 6 changes with the elapse of time. In the example in FIG. 6, the current focus lens position (Cur_fc) changes toward the target focus lens position (Tgt_fc) with the elapse of time. This is caused by moving the focus lens toward the in-focus position on the basis of the phase difference detection result of phase difference detection pixels (Ph0), which is obtained prior to the Ph1 depicted in (1) of FIG. 6, for example.

As described above, when the defocus amount (DF) is calculated on the basis of the phase difference detection pixel information (AF detection signal) outputted from the imaging element 65 with the focus lens being driven, the current focus lens position (Cur_fc) sequentially changes. As a result of this, the actual defocus amount also changes sequentially.

At start time t1 of the first exposure of phase difference detection pixels and AD conversion denoted by Ph1 in the (1) defocus amount calculation sequence on the upper stage in FIG. 6, the defocus amount is df1.

Also, at time t3 when the AD conversion denoted by Ph1 depicted in (1) of FIG. 6 is completed, the defocus amount is df3.

In FIG. 6, a defocus amount df2 at one certain time between time t1 to time t3 is also depicted.

The current focus lens positions (Cur_fc) at these times are different from one another. The defocus amount also changes during the period of time t1 to time t3.

In other words, an expression:

$$df1 = df2 = df3$$

is not established, and thus, an expression $$df1 \neq df2 \neq df3 \text{ is established.}$$

Even under this condition, at time t3 depicted in (1) of FIG. 6, the focus control section 80 calculates one defocus amount (DF) on the basis of the result of the exposure of the phase difference detection pixels (Ph1).

The one defocus amount (DF) calculated by the focus control section 80 is obtained in accordance with one set of phase difference information calculated on the basis of the result of the exposure of the phase difference detection pixels (Ph1).

In auto focus (AF) processing, the target focus lens position (Tgt_fc) which is a focus lens position for focusing on a subject needs to be calculated by use of the one defocus amount (DF) calculated by the focus control section 80.

A relational expression:

$$DF = (Tgt\_fc) - (Cur\_fc)$$

is established between the defocus amount DF, the target focus lens position (Tgt_fc), and the current focus lens position (Cur_fc).

Therefore, in order to calculate the target focus lens position (Tgt_fc), the current focus lens position (Cur_fc), which is the position of the focus lens at a point of time when one set of phase difference information used for calculation of the defocus amount DF calculated by the focus control section 80 is obtained, needs to be estimated.

One example of estimating the position of the focus lens at a point of time when phase difference information is calculated, will be explained with reference to FIG. 7.

As explained above with reference to FIG. 6, FIG. 7 depicts two diagrams:

(1) defocus amount calculation sequence; and (2) transition of a defocus amount, in association with each other along a time axis.

Figure 7:
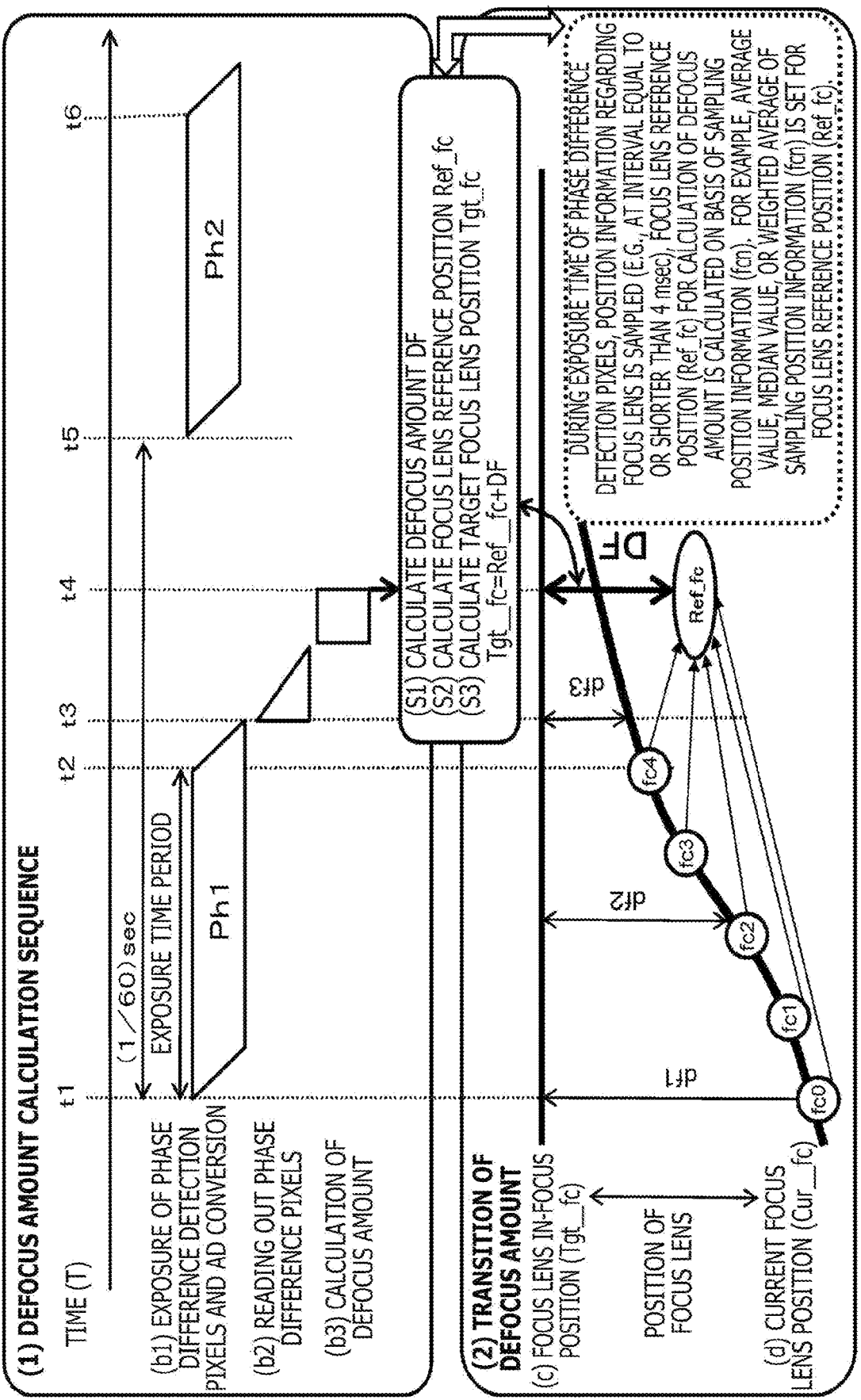
FIG. 7 is an explanatory diagram of an example of calculation of a defocus amount and calculation of a target focus lens position.

Similarly to FIG. 6, FIG. 7 depicts a process example of calculating the defocus amount (DF) on the basis of the phase difference detection pixel information (AF detection signal) outputted from the imaging element 65 while driving the focus lens, and the (d) current focus lens position (Cur_fc) depicted in the (2) transition of a defocus amount in FIG. 7 changes toward the target focus lens position (Tgt_fc) with the elapse of time.

This trajectory is identical to that in FIG. 6.

The focus control section 80 executes steps S1 to S3 depicted in the center of FIG. 7. In other words, the focus control section 80 executes the following steps S1 to S3:

(S1) calculate a defocus amount (DF);

(S2) calculate a focus lens reference position (Ref_fc); and (S3) calculate a target focus lens position (Tgt_fc), $$Tgt\_fc = Ref\_fc + DF.$$

In calculating the defocus amount (DF) in step S1, one defocus amount (DF), which is calculated on the basis of the result of the exposure of the phase difference detection pixels (Ph1), is calculated.

In calculating the focus lens reference position (Ref_fc) in step S2, the position of the focus lens at a point of time when the phase difference information is calculated, is estimated.

As depicted in FIG. 7, the focus control section 80 performs the following position estimation.

Information regarding the position of the focus lens during the period of time when the exposure of the phase difference detection pixels is performed to obtain the result of the exposure of the phase difference detection pixels (Ph1), is continuously acquired. Sampling is performed at an interval of 4 msec or shorter, for example.

The focus lens reference position (Ref_fc) is calculated on the basis of the position information (fcn to fcm) obtained by sampling.

The focus lens reference position (Ref_fc) is calculated from the average value, the median value, the weighted average, or the like of the sampling position information (fcn to fcm), for example.

In the aforementioned manner, calculation of the focus lens reference position (Ref_fc) in step S2 described above is performed.

Finally, in step S3, a position for setting the focus lens to focus on a subject, that is, the target focus lens position (Tgt_fc), is calculated by the following expression:

$$Tgt\_fc = Ref\_fc + DF.$$

As a result of execution of the above processes, one target focus lens position (Tgt_fc) is decided on the basis of the result of one-time exposure of the phase difference detection pixels (Ph1) even in the state where the focus lens is being driven, so that auto focus (AF) processing can be performed.

However, the aforementioned processes can be applied in a case where auto focus (AF) processing is performed with only the focus lens being driven.

For example, in a camera having such a lens as a varifocal lens having a configuration requiring focus adjustment in association with zoom adjustment, what is generally called zoom tracking for performing focus adjustment at time of zooming needs to be performed.

For example, when a user (photographing person) performs zoom adjustment to change a zoom position, a subject distance for focusing changes as a result of the zoom setting.

Therefore, in auto focus (AF) processing in a case where the zoom position is changed, proper focusing cannot be achieved unless the zoom position is taken into consideration.

An example of performing zoom setting in zoom tracking and setting a focus lens position, will be explained with reference to FIG. 8.

Figure 8:
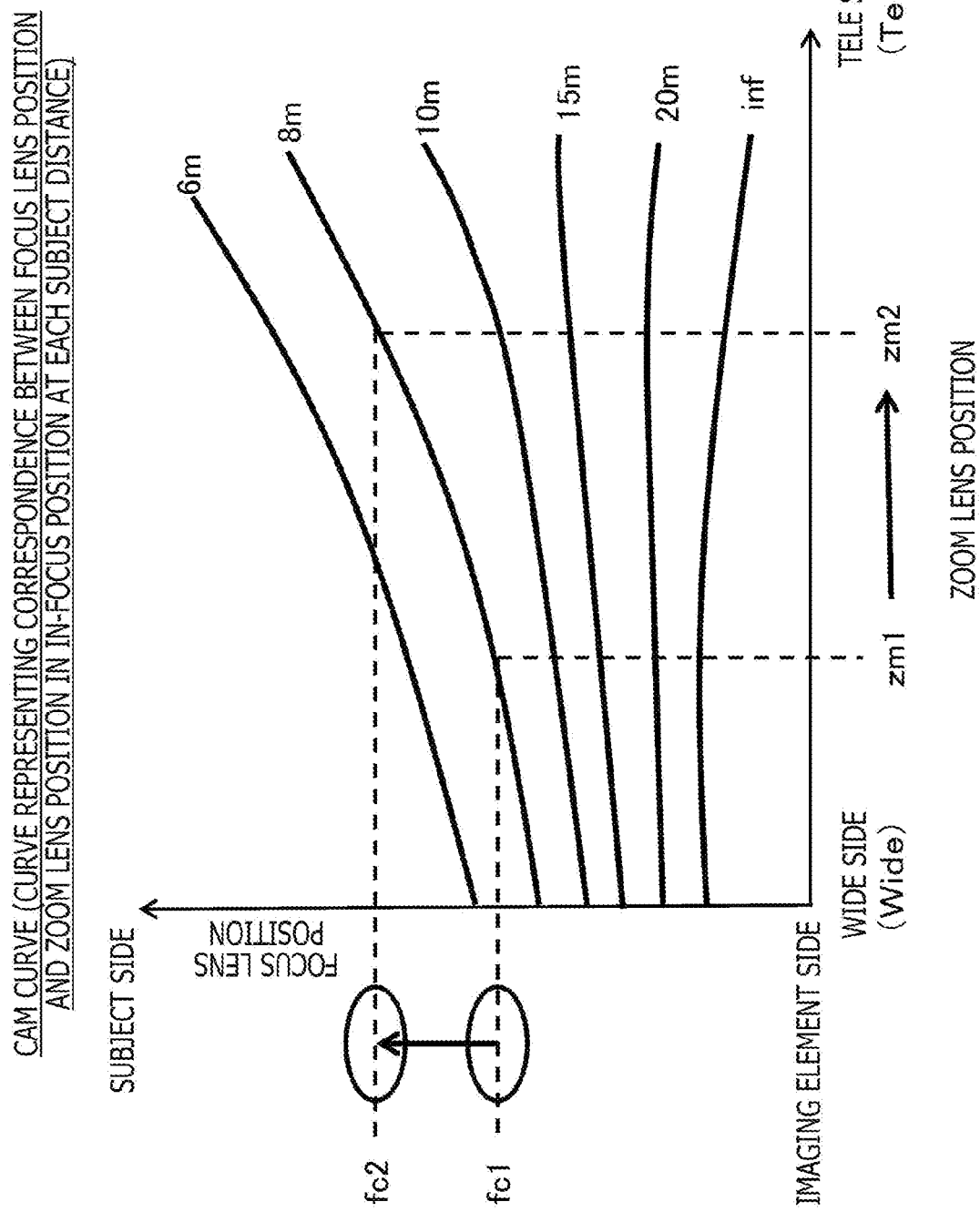
FIG. 8 is an explanatory diagram of a cam curve.

A curve depicted in FIG. 8 is called a cam curve.

The cam curve represents data on the correspondence between a zoom lens position and a focus lens position indicating an in-focus position corresponding to various subject distances.

In the graph depicted in FIG. 8, the horizontal axis represents a zoom lens position (Wide side to Tele side), and the vertical axis represents a focus lens position (imaging element side to subject side), and thus, the position of the zoom lens and the position of the focus lens in each of in-focus positions corresponding to a plurality of subject distances (26 m, 8 m, 10 m, 15 m, 20 m, and infinity (inf)) are depicted.

For example, in a case where the subject distance is 10 m, when the zoom lens position=zm1, the focus lens position for focusing on a subject is fc1.

However, in the case where the subject distance is also 10 m, when the zoom position is changed and the zoom lens position=zm2, the focus lens position for focusing on a subject is changed to fc2.

In this manner, when the user (photographing person) changes the position of the zoom lens, the in-focus state is not maintained. Accordingly, a defocused state is generated unless the focus lens is moved.

Therefore, in auto focus (AF) processing involving a change of the zoom position, proper processing cannot be performed unless the zoom position is taken into consideration.

[4. Auto Focus (AF) Processing in which Zoom Position is Taken into Consideration]

Next, a configuration in which proper auto focus (AF) processing can be performed even in a case where a zoom position is changed, that is, a zoom lens position is changed, will be explained.

As depicted in FIG. 9, in the imaging system 10 according to the present disclosure, the memory 42 of the interchangeable lens 20 and the memory 72 of the imaging device (body) 50 each store cam curve data having been explained with reference to FIG. 8.

In other words, data on the cam curve representing the correspondence between the zoom lens position and the focus lens position in an in-focus position at each subject distance, is held.

The cam curve represents data indicating the correspondence between the zoom lens position and the focus lens position in the imaging system 10.

In the imaging system 10 according to the present disclosure, auto focus (AF) processing is performed by referring to the cam curves stored in the memory 42 of the interchangeable lens 20 and the memory 72 of the imaging device (body) 50.

When the processing is performed by referring to the cam curves, high-precision auto focus (AF) processing can be achieved even in the case where zooming is performed Note that, in a case where either one of the interchangeable lens 20 or the imaging device (body) 50 holds the cam curve data, the device (the interchangeable lens 20 or the imaging device (body) 50) holding the cam curve may be configured to provide the cam curve data to the other device not holding the cam curve data.

In auto focus (AF) processing which is performed in the imaging system 10 according to the present disclosure, the interchangeable lens 20 regularly acquires the focus lens position and the zoom lens position, and outputs the focus lens position and the zoom lens position to the imaging device (body) 50.

As explained above with reference to FIG. 7, acquisition of the lens position information is performed multiple times at an interval of 4 msec or shorter, or the like, for example, during a period of one-time exposure of the phase difference detection pixels.

The lens position information acquired by the interchangeable lens 20 is sequentially, or as data obtained by compiling values obtained by multiple times of measurement, outputted to the imaging device (body) 50.

By using the position information regarding the focus lens and the zoom lens, pixel information regarding the phase difference detection pixels, and the cam curve, the imaging device (body) 50 calculates the in-focus position of the focus lens in which the zoom position has been taken into consideration, that is, the target focus lens position (Tgt_fc).

A specific process sequence thereof will be explained with reference to FIG. 10 and later.

Figure 10:
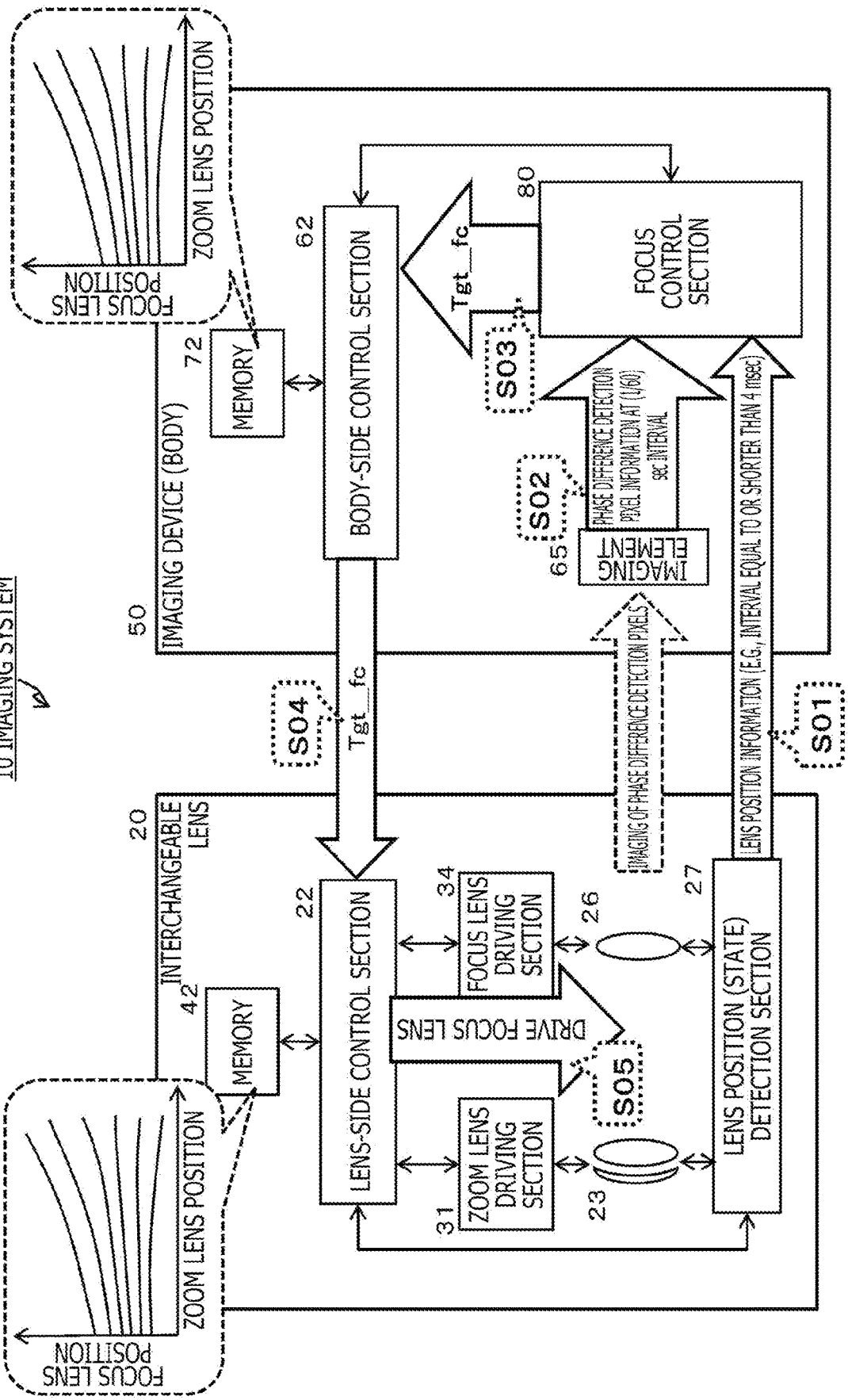
FIG. 10 is an explanatory diagram of one example of a data processing sequence in the imaging system according to the present disclosure.

FIG. 10 is an explanatory diagram of the overall sequence of auto focus (AF) processing which is executed by the imaging system 10 according to the present disclosure and in which the zoom position is taken into consideration.

FIG. 10 depicts only components which are mainly used for auto focus (AF) processing, among the components of the interchangeable lens 20 and the imaging device (body) 50 in the imaging system 10 explained above with reference to FIG. 2.

Note that the same cam curve corresponding to the imaging system 10 is stored in each of the memory 42 of the interchangeable lens 20 and the memory 72 of the imaging device (body) 50.

In FIG. 10, steps S01 to S05 are depicted as a process procedure (sequence) of auto focus processing.

First, the overall flow of auto focus processing which is performed in the imaging system according to the present disclosure will be explained with reference to FIG. 10. Thereafter, the details of the steps will be explained with reference to FIG. 11 and later.

Steps S01 to S05 depicted in FIG. 10 will be explained.

(Step S01)

In step S01, the lens position (state) detection section 27 of the interchangeable lens 20 detects lens position information, that is, a focus lens position and a zoom lens position, and transmits the detected lens position information from the interchangeable lens 20 side to the focus control section 80 of the imaging device (body) 50.

Note that data exchange between the interchangeable lens 20 and the imaging device (body) 50, which is omitted in FIG. 10, is performed via the lens-side control section 22 and the mount section 21 of the interchangeable lens 20 and the body-side control section 62 and the mount section 61 of the imaging device (body) 50.

The lens position (state) detection section 27 of the interchangeable lens 20 performs acquisition of the focus lens position and the zoom lens position at a fixed interval of 4 msec or shorter, for example.

In other words, as explained above with reference to FIG. 7, acquisition of the lens positions is performed at least two or more times during the period of the one-time exposure of the phase difference detection pixels.

The lens position information acquired by the lens position (state) detection section 27 of the interchangeable lens 20 is sequentially, or as data obtained by compiling values obtained by multiple times of measurement, outputted to the imaging device (body) 50.

(Step S02)

In step S02, the phase difference detection pixel information, which is the result of the exposure of the phase difference detection pixels obtained by the imaging element 65 of the imaging device (body) 50, is inputted to the focus control section 80, and the defocus amount (DF) is calculated by the focus control section 80.

As explained above with reference to FIG. 7, the exposure of the phase difference detection pixels is performed at a (1/60)-sec interval, for example. Therefore, the phase difference detection pixel information is inputted to the focus control section 80 at the (1/60)-sec interval.

By using the phase difference detection pixel information, the focus control section 80 calculates the defocus amount (DF).

(Step S03)

Step S03 is executed by the focus control section 80 of the imaging device (body) 50.

The focus control section 80
receives an input of the position information regarding the focus lens and the zoom lens from the interchangeable lens 20, in step S01, and
receives an input of pixel information regarding the phase difference detection pixels from the imaging element 65, in step S02.

By using the inputted information, and
the cam curve stored in the memory 72, the focus control section 80 calculates the in-focus position of the focus lens in which the zoom position is taken into consideration, that is, the target focus lens position (Tgt_fc).

Note that the target focus lens position (Tgt_fc) is the subject distance information indicating the subject distance for focusing, or the lens position for focusing on a subject.

Note that the calculation of the target focus lens position (Tgt_fc) by the focus control section 80 is performed at the phase difference detection pixel information input interval (i.e., at a (1/60)-sec interval, in the present embodiment).

A specific example of calculation of the target focus lens position (Tgt_fc) by the focus control section 80 will be explained later.

(Step S04)

In step S04, the target focus lens position (Tgt_fc) calculated by the focus control section 80 of the imaging device (body) 50 is transmitted from the body-side control section 62 of the imaging device (body) 50 to the lens-side control section 22 of the interchangeable lens 20.

(Step S05)

Step S05 is executed by the lens-side control section 22 and the focus lens driving section 34 of the interchangeable lens 20.

By using
the target focus lens position (Tgt_fc) inputted from the imaging device (body) 50,
the current zoom lens position (zm_now), and
the cam curve stored in the memory 42, the lens-side control section 22 and the focus lens driving section 34 of the interchangeable lens 20 newly calculate the latest target focus lens position (Tgt_fc now), and drive the focus lens 26 toward the latest target focus lens position (Tgt_fc now).

The outline of the overall flow of the auto focus processing which is executed in the imaging system according to the present disclosure has been explained above with reference to FIG. 10.

Next, the details of the steps will be explained with reference to FIG. 11 and later.

(Step S01)

First, step S01 will be explained in detail with reference to FIG. 11.

As explained with reference to FIG. 10, in step S01, the lens position (state) detection section 27 of the interchangeable lens 20 detects the lens position information, that is, the focus lens position and the zoom lens position, and transmits the detected lens position information from the interchangeable lens 20 side to the focus control section 80 of the imaging device (body) 50.

Figure 11:
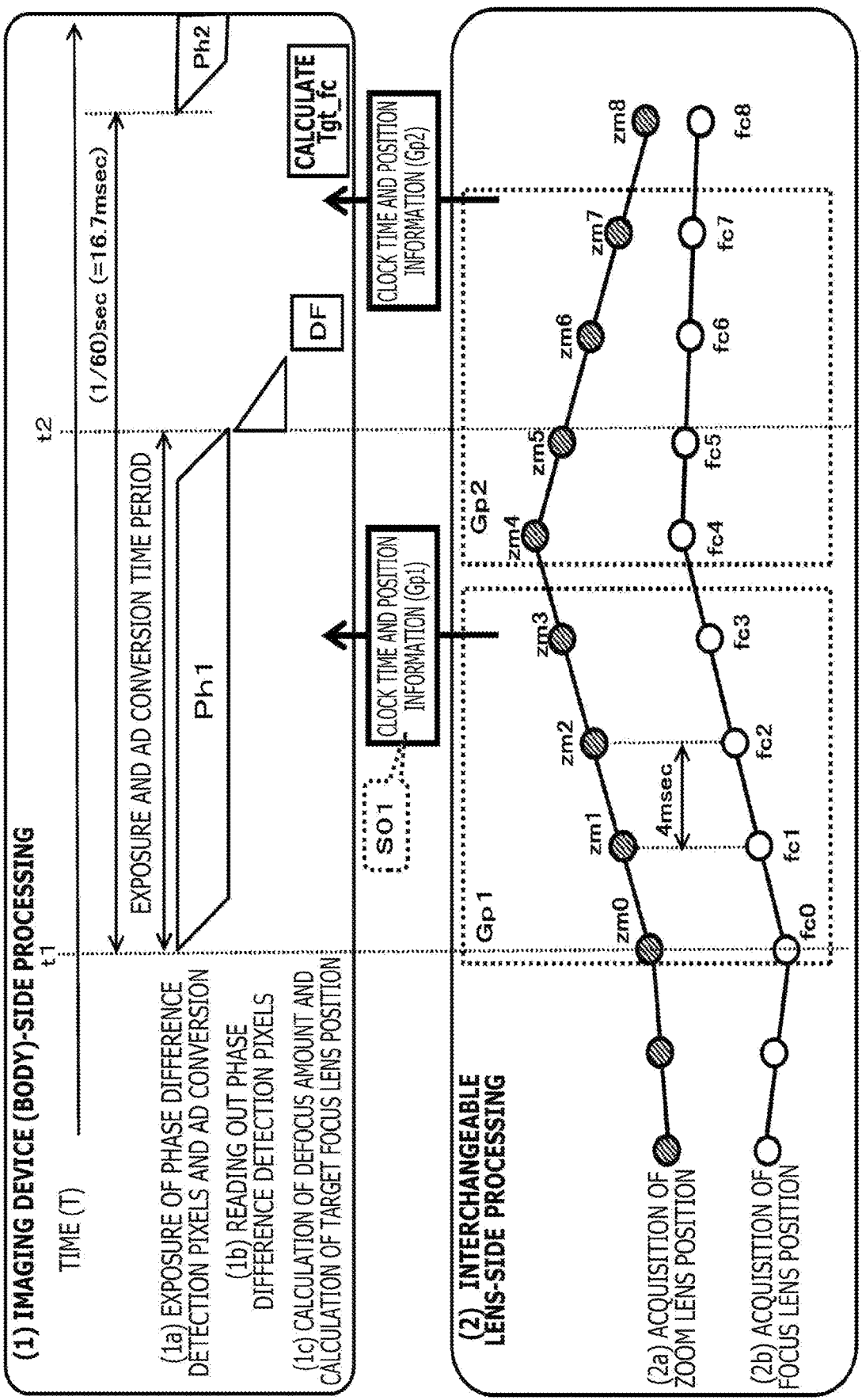
FIG. 11 is an explanatory diagram of acquisition and transmission of lens position information which are executed by the imaging system according to the present disclosure.

FIG. 11 depicts the following two diagrams on the upper and lower stages, respectively:

(1) imaging device (body)-side processing; and
(2) interchangeable lens-side processing.

The two types of processing are depicted in time series.

The time axis is depicted on the upper portion of the (1) imaging device (body)-side processing in the upper stage. Time elapses from left to right.

The (1) imaging device (body)-side processing on the upper stage in FIG. 11 depicts the following processes in time series:

(1a) exposure of phase difference detection pixels and AD conversion;
(1b) reading out phase difference detection pixels; and (1c) calculation of a defocus amount (DF) and calculation of a target focus lens position (Tgt_fc).

The above processes respectively correspond to:

(b1) exposure of phase difference detection pixels and AD conversion;

(b2) reading out phase difference detection pixels; and (b3) calculation of a defocus amount, which are depicted in the (1) defocus amount calculation sequence in FIGS. 5 to 7 having been explained above.

However, (1c) in FIG. 11 includes calculation of a target focus lens position (Tgt_fc), in addition to calculation of the defocus amount (DF).

This process will be explained later.

In (1) of FIG. 11, one-time exposure of the phase difference detection pixels and AD conversion (Ph1), which are performed during a time period from time t1 to time t2, are depicted as the "(1a) exposure of phase difference detection pixels and AD conversion".

In (1a) of FIG. 11, Ph1 denotes a process similar to that of the (b1) exposure of phase difference detection pixels and AD conversion in the (1) defocus amount calculation sequence having been explained above with reference to FIGS. 5 to 7, and denotes the exposure of the phase difference detection pixels and the AD conversion which are performed at a (1/60) sec-interval (=16.7 msec-interval).

On the other hand, the (2) interchangeable lens-side processing on the lower stage in FIG. 11 depicts the following processes in time series:

(2a) acquisition of the zoom lens position; and (2b) acquisition of the focus lens position.

In the (2) interchangeable lens-side processing on the lower stage in FIG. 11, zm0, zm1, zm2, . . . each denote zoom lens position information which is regularly acquired (sampled) by the lens position (state) detection section 27 of the interchangeable lens 20.

Also, fc0, fc1, fc2, . . . each denote focus lens position information which is regularly acquired by the lens position (state) detection section 27 of the interchangeable lens 20.

The lens position (state) detection section 27 of the interchangeable lens 20 performs acquisition of the focus lens position and the zoom lens position at a fixed interval.

Note that, in this embodiment, the lens position (state) detection section 27 performs acquisition of the focus lens position (fcn) and the zoom lens position (zmn) at an interval of 4 msec or shorter, for example.

The lens position acquisition interval can be set variously. However, acquisition of the lens positions is performed at least two or more times during the period of the one-time exposure of the phase difference detection pixels.

The lens position information acquired by the lens position (state) detection section 27 of the interchangeable lens 20 is sequentially or as data obtained by compiling multiple-times acquisition values, outputted to the imaging device (body) 50.

In the example depicted in FIG. 11, a plurality of focus lens positions (fcn) and a plurality of zoom lens positions (zmn) acquired during a predetermined period of time (approximately, 10 msec) by the lens position (state) detection section 27 are grouped, and are outputted to the imaging device (body) 50 by groups (Gp1, Gp2, . . . ).

This process corresponds to step S01 depicted in FIG. 11.

The lens position (state) detection section 27 outputs, to the imaging device (body) 50, a plurality of focus lens positions (fcn) and a plurality of zoom lens positions (zmn) acquired during the predetermined period of time (approximately, 10 msec) in association with lens position acquisition time (sampling time) information regarding the corresponding lens positions.

Note that, as the time information, absolute time information supplied from a clock in the lens-side control section 22 is used, for example.

FIG. 12 depicts an example of the lens position information which is outputted from the interchangeable lens 20 to the imaging device (body) 50.

In FIG. 12, an example of a series of data which is outputted from the interchangeable lens 20 to the imaging device (body) 50 is depicted.

The data is outputted from the interchangeable lens 20 to the imaging device (body) 50 by groups, that is, by a group 1 (Gp1) and a group 2 (Gp2) depicted in FIG. 12.

Data of the group 1 (Gp1) is configured by four lens position data sets acquired at the predetermined interval of 4 msec or shorter, for example, during a time period of time ts0 msec to ts3 msec indicating the lens position sampling times, that is, the following data sets:

time=ts0 msec: lens positions (zm0, fc0);

time=ts1 msec: lens positions (zm1, fc1);

time=ts2 msec: lens positions (zm2, fc2); and time=ts3 msec: lens positions (zm3, fc3).

These data sets are collectively outputted from the interchangeable lens 20 to the imaging device (body) 50.

Note that an abstract expression is used here for the data such as zm0 and fc0, but the position data actually indicates a specific lens position.

These data sets are stored in the memory 72 of the imaging device (body) 50, and are used in step S03 which is executed by the focus control section 80 of the imaging device (body) 50, that is, calculation of the target focus lens position (Tgt_fc).

(Step S02)

Next, the details of step S02 will be explained with reference to FIG. 13.

As explained above with reference to FIG. 10, in step S02, phase difference detection pixel information which is the result of the exposure of the phase difference detection pixels in the imaging element 65 of the imaging device (body) 50 is inputted to the focus control section 80, and the defocus amount (DF) is calculated by the focus control section 80.

Figure 13:
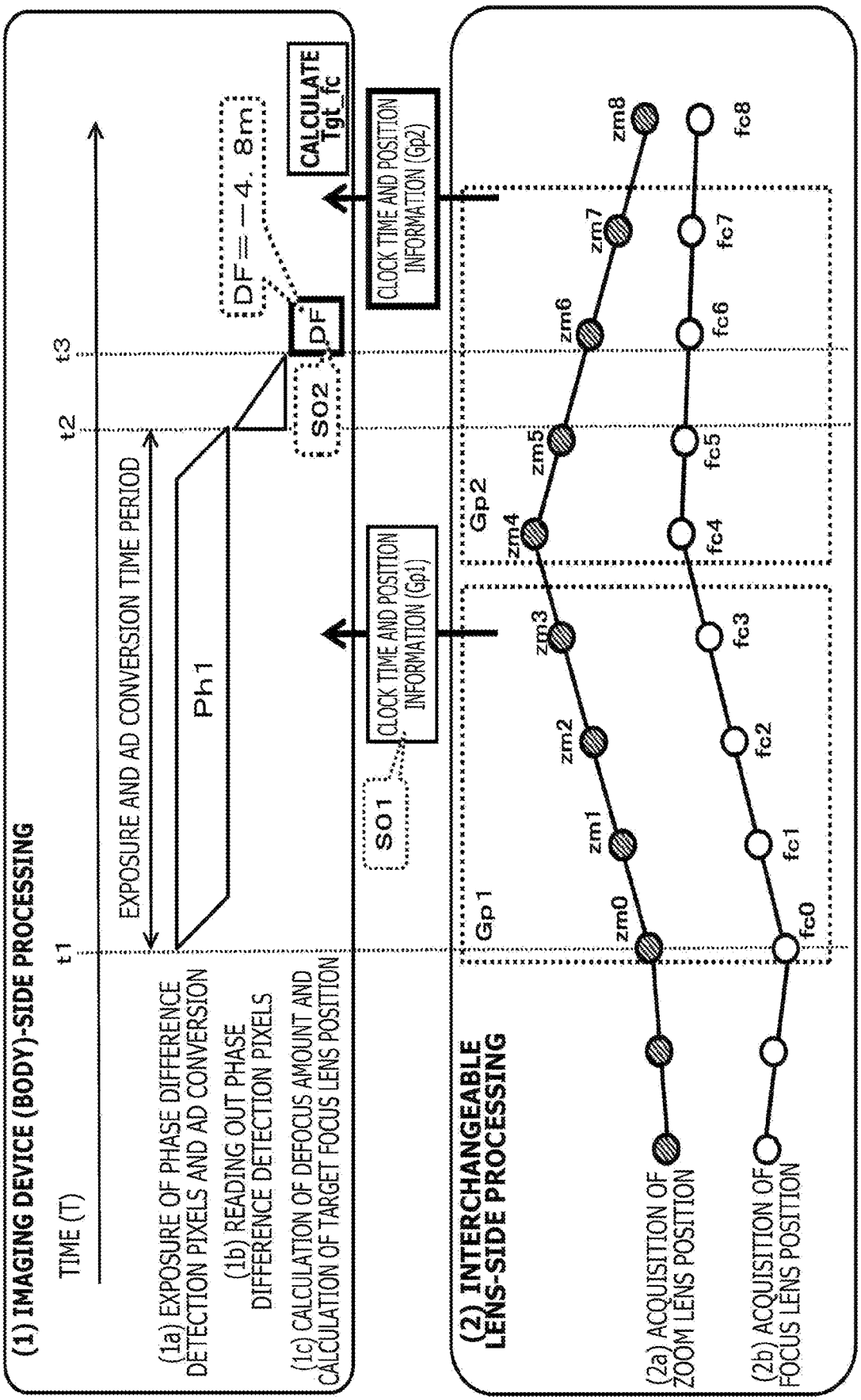
FIG. 13 is an explanatory diagram of calculation of a defocus amount, which is executed by the imaging system according to the present disclosure.

FIG. 13 is similar to FIG. 11 having been explained above, and depicts the following two diagrams on the upper and lower stages:

(1) imaging device (body)-side processing; and (2) interchangeable lens-side processing.

These two types of processing are depicted in time series.

Step S02 is [DF] of the "(1c) calculation of a defocus amount (DF) and calculation of a target focus lens position (Tgt_fc)" in the (1) imaging device (body)-side processing of FIG. 13.

The process sequence of the (1) imaging device (body)-side processing in FIG. 13 is as follows.

During a period from time t1 to t2, the (1a) exposure of phase difference detection pixels and the AD conversion are performed.

This process is performed by the imaging element 65 and the AD conversion section 66 of the imaging device (body) 50.

During the following period from time t2 to t3, the (1b) reading out phase difference detection pixels is performed.

In this process, the focus control section 80 of the imaging device (body) 50 sequentially reads out the phase difference detection pixel information (pixel values) having undergone AD conversion, from the AD conversion section 66.

After time t3, step S02, that is, calculation of the defocus amount (DF), is performed.

The exposure of the phase difference detection pixels is performed at a (1/60)-sec interval, for example. Therefore, the phase difference detection pixel information is inputted to the focus control section 80 at a (1/60)-sec interval.

By using the phase difference detection pixel information, the focus control section 80 calculates a defocus amount (DF) at the (1/60)-sec interval.

Calculation of the defocus amount is performed in the same manner as a conventional one.

In other words, the focus control section 80 analyzes the phase difference between a pair of images from the phase difference detection pixel information, and calculates the focus deviation amount (defocus amount (DF)) from an object to be focused (focus target).

In one example, the calculated defocus amount (DF) is defined by $$DF=-0.48 \text{ m}.$$

This defocus amount (DF) corresponds to the deviation amount between the subject distance and the in-focus distance of the "current focus lens position".

However, the calculated defocus amount (DF) has the problem explained above with reference to FIG. 7. In other words, it is unclear where the aforementioned "current focus lens position" is.

The defocus amount (DF) calculated by the focus control section 80 is one value obtained from the period from time t1 to t2 depicted in the (1a) exposure of phase difference detection pixels and AD conversion of the (1) imaging device (body)-side processing in FIG. 13, that is, the result of the exposure of the phase difference detection pixels and the AD conversion. However, the lens position sequentially changes because the focus lens and the zoom lens also move during the period from time t1 to t2.

Therefore, there is a problem that the calculated defocus amount (DF) is merely information corresponding to the position of the focus lens at a certain point of time between time t1 and t2.

(Step S03)

Next, step S03 will be explained with reference to FIG. 14 and later.

As described above with reference to FIG. 10, step S03 is executed by the focus control section 80 of the imaging device (body) 50.

The focus control section 80 receives an input of position information regarding the focus lens and the zoom lens from the interchangeable lens 20, in step S01, and receives an input of pixel information regarding phase difference detection pixels from the imaging element 65, in step S02.

By using the inputted information, and the cam curve stored in the memory 72, the focus control section 80 calculates the in-focus position of the focus lens in which the zoom position has been taken into consideration, that is, the target focus lens position (Tgt_fc).

Step S03, which is depicted at the right end of the "(1c) calculation of a defocus amount (DF) and calculation of a target focus lens position (Tgt_fc)" of the (1) imaging device (body)-side processing in FIG. 14, is calculation of the target focus lens position (Tgt_fc) that is performed by the focus control section 80.

The focus control section 80 calculates the target focus lens position (Tgt_fc) by the following procedures:

(procedure 1) calculation of a focus lens reference position (Ref_fc); and (procedure 2) calculation of a target focus lens position (Tgt_fc) by using focus lens reference position (Ref_fc) and the defocus amount (DF) calculated at step S02, in accordance with an expression $$Tgt\_fc=Ref\_fc+DF.$$

Note that the target focus lens position (Tgt_fc) is subject distance information indicating a subject distance for focusing or a lens position for focusing on a subject.

Hereinafter, these procedures will be explained in detail.

First, (procedure 1) calculation of a focus lens reference position (Ref_fc) will be explained.

By using focus lens positions (fcn) and zoom lens positions (zmn) obtained during a time period from start time (t1) of exposure of phase difference detection pixels used for calculation of the defocus amount (DF) in step S02 to start time (t3) of calculation of the defocus amount (DF) in step S02, the focus control section 80 of the imaging device (body) 50 calculates the focus lens reference position (Ref_fc) of this time period.

Lens position information during the period from the start time (t1) of the exposure of the phase difference detection pixels to the start time (t3) of the calculation of the defocus amount (DF) is reference position calculation data depicted in the (2) interchangeable lens-side processing in FIG. 14. In other words, the lens position information including six pairs (zm0, fc0) to (zm5, fc5) including focus lens position information: fc0 to fc5, and zoom lens position information: zm0 to zm5, is set as reference position calculation data, and the reference position calculation data (zm0, fc0) to (zm5, fc5) is developed on the cam curve, whereby the focus lens reference position (Ref_fc) is calculated.

Figure 15:
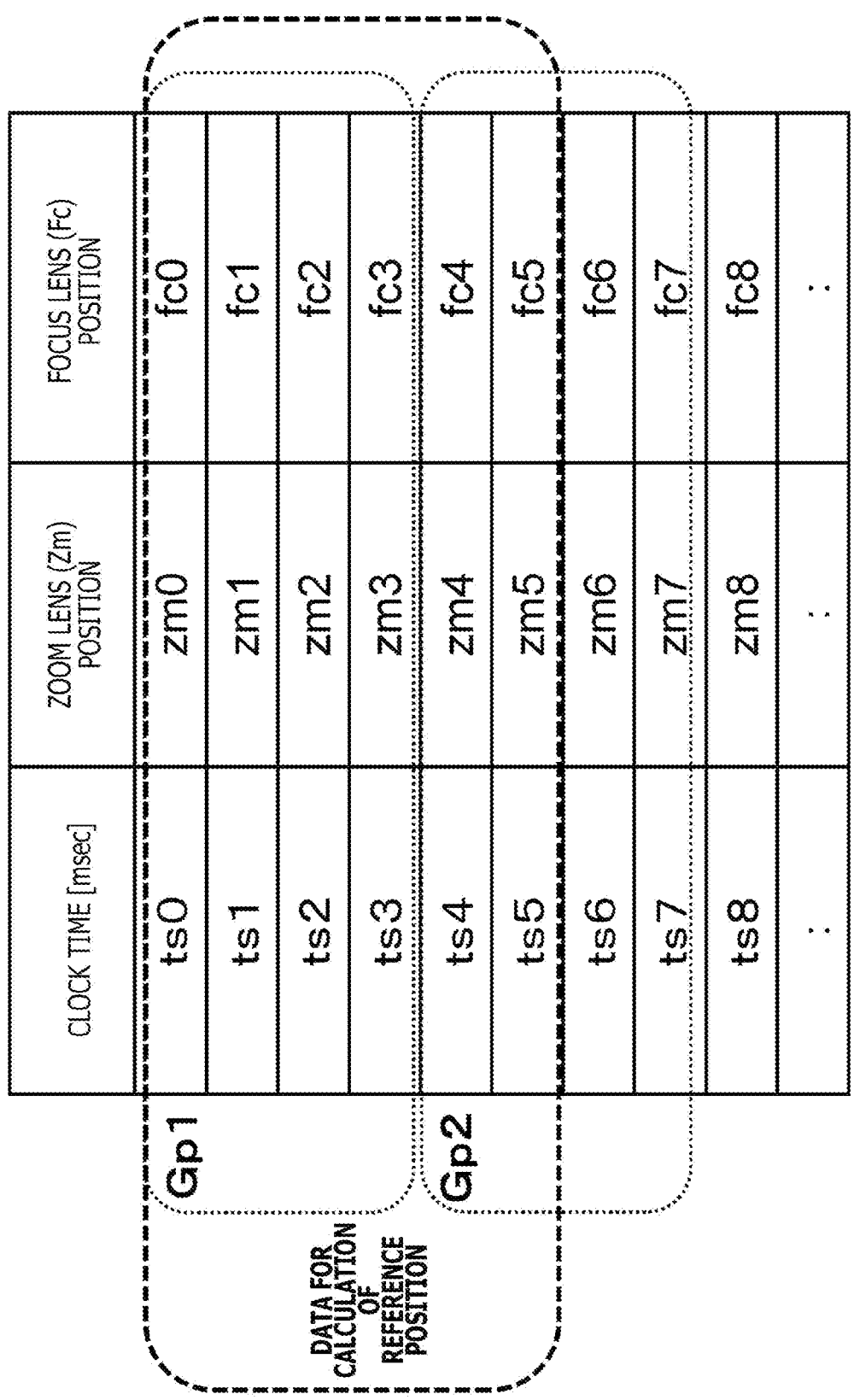
FIG. 15 is an explanatory diagram of calculation of a target focus lens position, which is executed by the imaging system according to the present disclosure.

FIG. 15 depicts data similar to that having been explained above with reference to FIG. 12, and depicts lens position information which is transmitted from the lens position (state) detection section 27 of the interchangeable lens 20 to the imaging device (body) 50 side.

This information is stored in the memory 72 of the imaging device (body) 50.

The focus control section 80 of the imaging device (body) 50 selects and acquires reference position calculation data from the lens position information, which is depicted in FIG. 15 and is stored in the memory 72 of the imaging device (body) 50.

In other words, the reference position calculation data is lens position information including focus lens position information: fc0 to fc5, and zoom lens position information: zm0 to zm5, which is obtained during the time period from the start time (t1) of the exposure of the phase difference detection pixels to the start time (t3) of the calculation of the defocus amount (DF) in step S02.

The focus control section 80 sets the six pairs (zm0, fc0) to (zm5, fc5) of the lens position information as reference position calculation data, develops the reference position calculation data (zm0, fc0) to (zm5, fc5) on the cam curve, and thereby calculates the focus lens reference position (Ref_fc).

The focus control section 80 acquires the cam curve stored in the memory 72, that is, cam curve data indicating the correspondence between the zoom lens position and the focus lens position in an in-focus position at each subject distance, and develops the aforementioned reference position calculation data on the cam curve.

This process will be explained with reference to FIG. 16.

Figure 16:
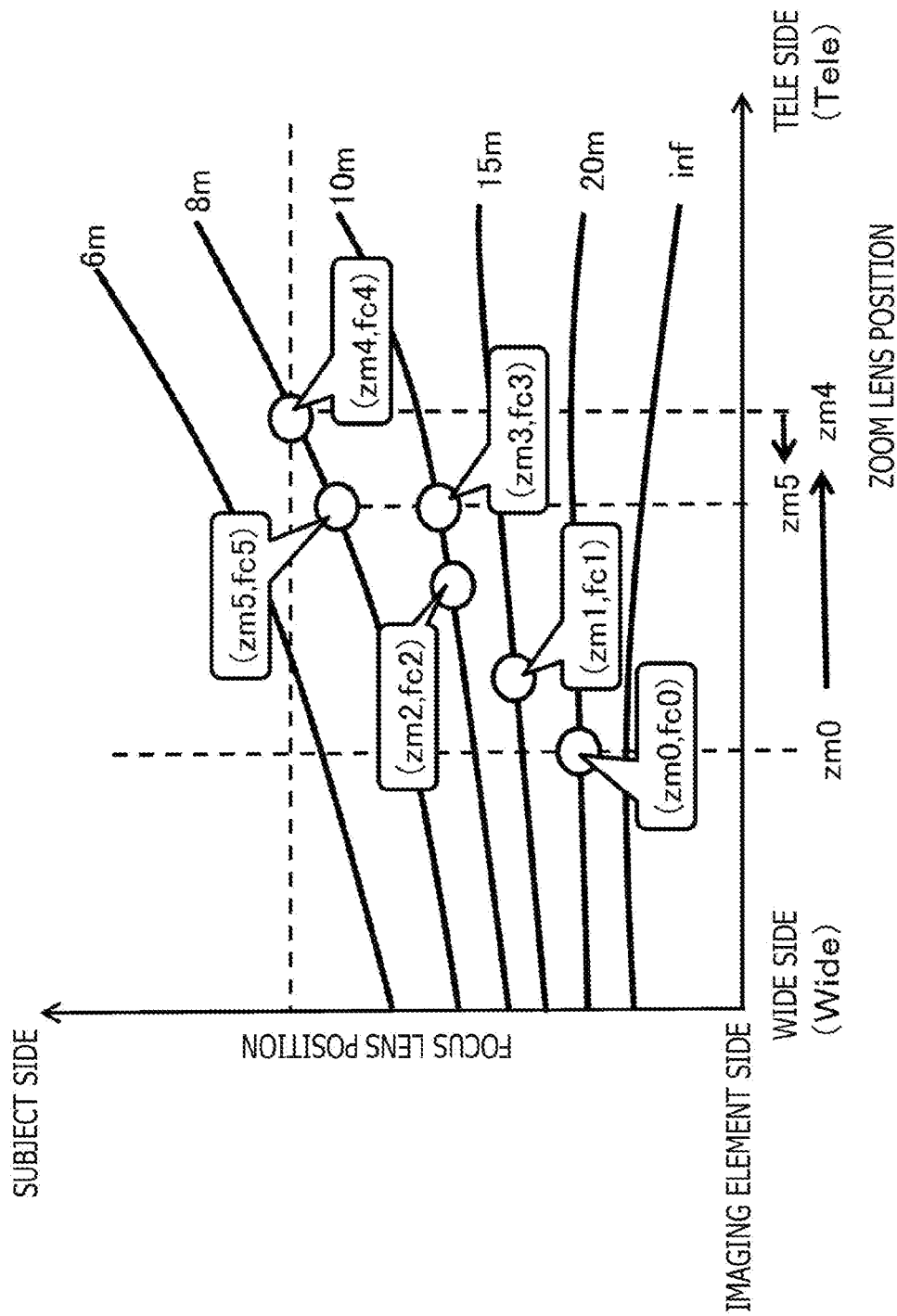
FIG. 16 is an explanatory diagram of calculation of a target focus lens position, which is executed by the imaging system according to the present disclosure.

FIG. 16 depicts a cam curve acquired from the memory 72 by the focus control section 80.

The focus control section 80 detects, from the cam curve, points corresponding to the reference position calculation data (zm0, fc0) to (zm5, fc5).

As depicted in FIG. 16, the points corresponding to the reference position calculation data (zm0, fc0) to (zm5, fc5) are decided on the cam curve.

For example, from the cam curve, it can be found that the zoom lens position=zm0 and the focus lens position=fc0 included in the reference position calculation data (zm0, fc0) are a zoom lens position and a focus lens position for focusing on a subject at a subject distance=20 m.

Also for the remaining reference position calculation data (zm1, fc2) to (zm5, fc5), the following information can similarly be obtained from the cam curve.

The reference position calculation data (zm1, fc1) corresponds to a lens position (the zoom lens position and the focus lens position) for focusing on a subject at a subject distance=15 m.

The reference position calculation data (zm2, fc2) corresponds to a lens position (the zoom lens position and the focus lens position) for focusing on a subject at a subject distance=10 m.

The reference position calculation data (zm3, fc3) corresponds to a lens position (the zoom lens position and the focus lens position) for focusing on a subject at a subject distance=10 m.

The reference position calculation data (zm4, fc4) corresponds to a lens position (the zoom lens position and the focus lens position) for focusing on a subject at a subject distance=8 m.

The reference position calculation data (zm5, fc5) corresponds to a lens position (the zoom lens position and the focus lens position) for focusing on a subject at a subject distance=5 m.

By using the detection result of points, on the cam curve, corresponding to the reference position calculation data (zm0, fc0) to (zm5, fc5), the focus control section 80 calculates the focus lens reference position (Ref_fc).

Figure 17:
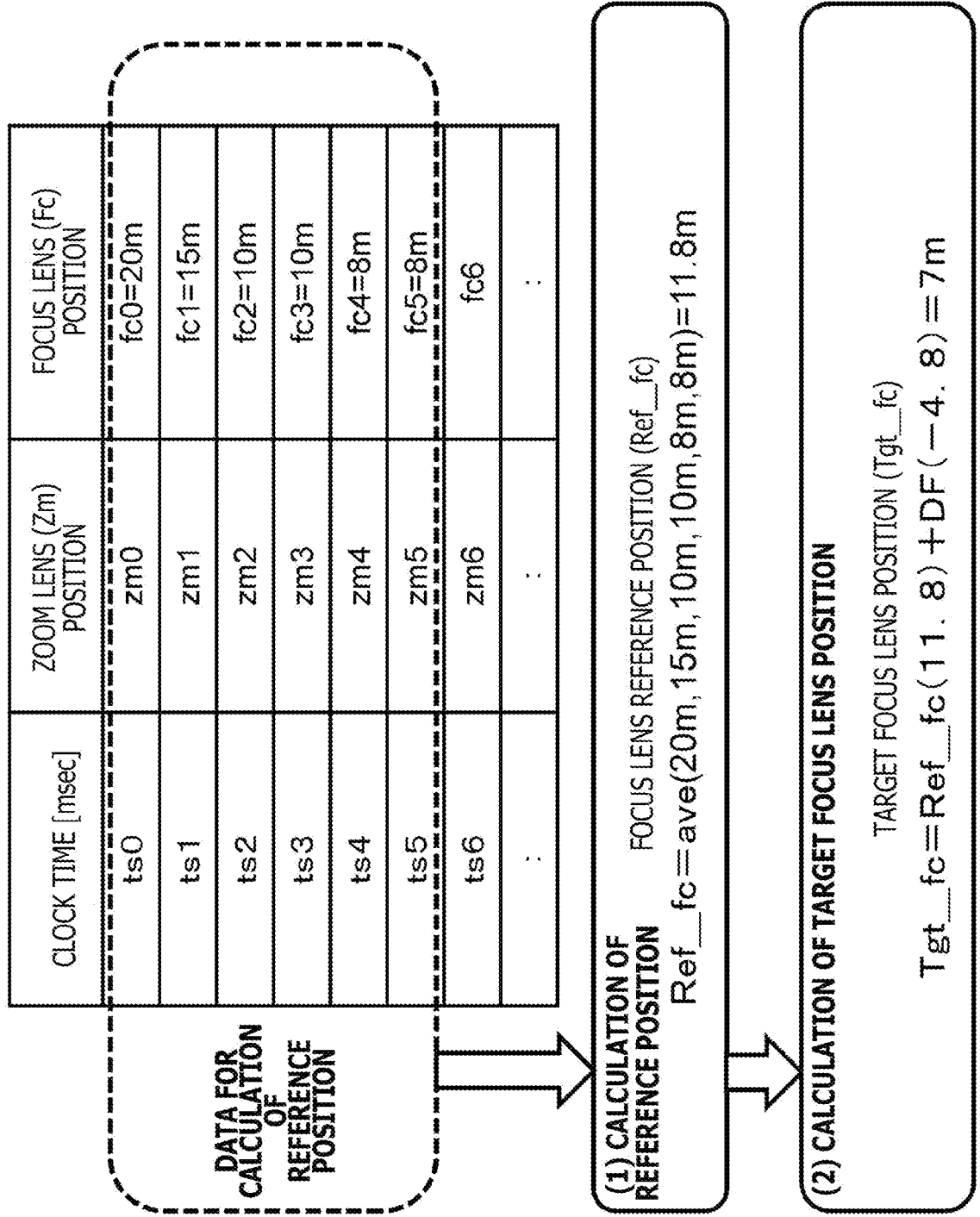
FIG. 17 is an explanatory diagram of calculation of a target focus lens position, which is executed by the imaging system according to the present disclosure.

FIG. 17 depicts a specific example of calculation of a focus lens reference position (Ref_fc).

From the detection result of points, on the cam curve, corresponding to the reference position calculation data (zm0, fc0) to (zm5, fc5) depicted in FIG. 17, the focus control section 80 acquires, on the cam curve, information regarding a subject distance when each of the focus lens positions (fc0 to fc5) is in an in-focus position. In the present example, as explained above with reference to FIG. 16, the in-focus position (=subject distance for focusing) is as follows:

fc0=20 m, fc1=15 m, fc2=10 m, fc3=10 m, fc4=8 m, and fc5=8 m.

The focus control section 80 calculates the average value (ave) of the above data as the focus lens reference position (Ref_fc). In other words, the focus control section 80 calculates the focus lens reference position (Ref_fc) by the following expression:

Ref_fc=ave(20 m, 15 m, 15 m, 10 m, 10 m, 8 m, 8 m)=11.8 m.

The calculated value 11.8 m is set as the focus lens reference position (Ref_fc) during the time period from the start time (t1) of the exposure of the phase difference detection pixels to the start time (t3) of calculation of the defocus amount (DF) in step S02 in FIG. 14.

Note that the calculated focus lens reference position (Ref_fc) is not a value directly representing the focus lens position in the interchangeable lens 20, but a value obtained by converting the focus lens position to a subject distance.

The focus control section 80 calculates, as the focus lens reference position (Ref_fc), the distance (distance from the camera) of a subject to be focused.

The above example has a configuration in which the focus lens reference position (Ref_fc) is calculated from the points, on the cam curve, corresponding to the reference position calculation data (fcn to fcm) which is the sampling position information, that is, from the average value (ave) of the subject distance at an in-focus position.

However, this calculation is one example. The focus lens reference position (Ref_fc) may be calculated not only from the points, on the cam curve, corresponding to the reference position calculation data (fcn to fcm), that is, the average value (ave) of the subject distance at an in-focus position, but also from the points, on the cam curve, corresponding to the reference position calculation data (fcn to fcm), that is, the median value, the weighted average, or the like of the subject distance at an in-focus position, for example.

Next, by using the calculated focus lens reference position (Ref_fc)=11.8 m, and the defocus amount (DF)=−4.8 m calculated in step S02, the focus control section 80 calculates the target focus lens position (Tgt_fc) for obtaining an in-focus state of the focus lens.

As depicted in FIG. 17, the focus control section 80 calculates the target focus lens position (Tgt_fc) in accordance with the following expression:

$$\text{Tgt\_fc} = (\text{Ref\_fc}) + (DF) = 11.8 - 4.8 = 7 \text{ m.}$$

Note that the target focus lens position (Tgt_fc)=7 m calculated by the above expression is not a value directly representing the focus lens position in the interchangeable lens 20, but a value obtained by converting the focus lens position to a subject distance.

The focus control section 80 calculates, as the target focus lens position (Tgt_fc), a distance (distance from the camera) to a subject to be focused.

As depicted in FIG. 17, the focus control section 80 calculates the target focus lens position (Tgt_fc) by computation of the focus lens reference position (Ref_fc) and the defocus amount (DF).

As a result of this, the target focus lens position (Tgt_fc) is 7 m. In other words, a focus lens position, at which a subject at the subject distance=7 m can be focused, is calculated as the target focus lens position (Tgt_fc).

(Step S04)

Next, step S04 will be explained with reference to FIG. 18.

As described above with reference to FIG. 10, in step S04, the target focus lens position (Tgt_fc) calculated by the focus control section 80 of the imaging device (body) 50 is transmitted from the body-side control section 62 of the imaging device (body) 50 to the lens-side control section 22 of the interchangeable lens 20.

Figure 18:
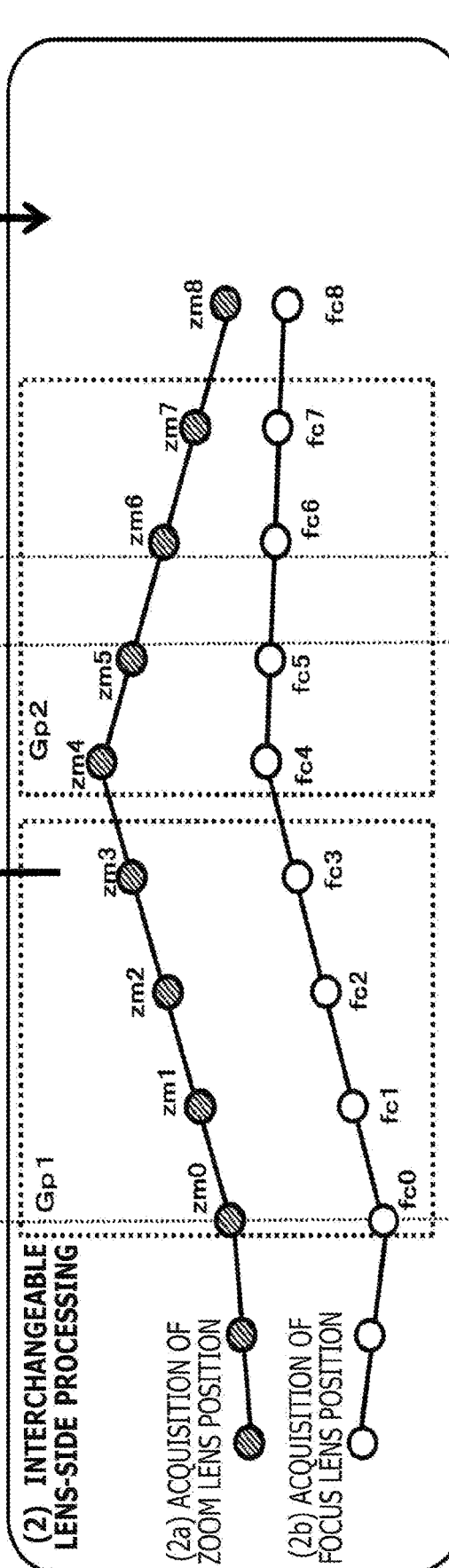
FIG. 18 is an explanatory diagram of transmission of a target focus lens position, which is executed by the imaging system according to the present disclosure.

In FIG. 18, this process is denoted by step S04. The target focus lens position (Tgt_fc) calculated by the focus control section 80 of the imaging device (body) 50 is transmitted to the lens-side control section 22 of the interchangeable lens 20 via the body-side control section 62 of the imaging device (body) 50.

(Step S05)

Next, step S05 will be explained with reference to FIG. 19.

As explained above with reference to FIG. 10, step S05 is executed by the lens-side control section 22 and the focus lens driving section 34 of the interchangeable lens 20.

Figure 19:
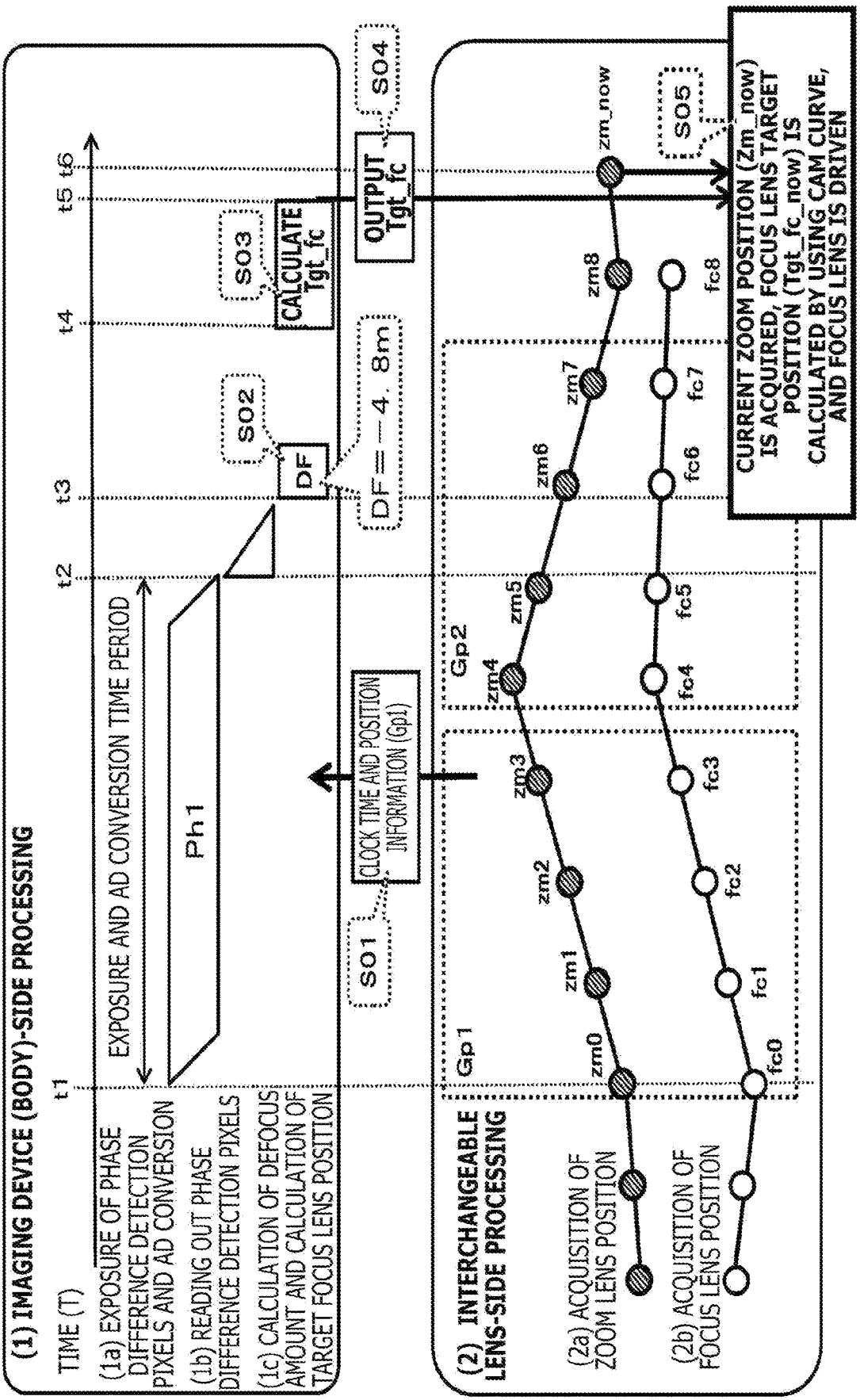
FIG. 19 is an explanatory diagram of focus lens driving, which is executed by the imaging system according to the present disclosure.

As depicted in step S05 in FIG. 19, the lens-side control section 22 of the interchangeable lens 20 receives an input of the target focus lens position (Tgt_fc) from the imaging device (body) 50, and then, acquires the latest zoom lens position (zm_now) at present.

This information is acquired from the lens position (state) detection section 27 of the interchangeable lens 20.

Next, the lens-side control section 22 detects, from the cam curve acquired from the memory 42, the corresponding position between the target focus lens position (Tgt_fc)=7 m inputted from the imaging device (body) 50 and the current zoom lens position (zm_now), and newly calculates the latest target focus lens position (Tgt_fc now) in accordance with the detected position.

This process will be explained with reference to FIG. 20.

Figure 20:
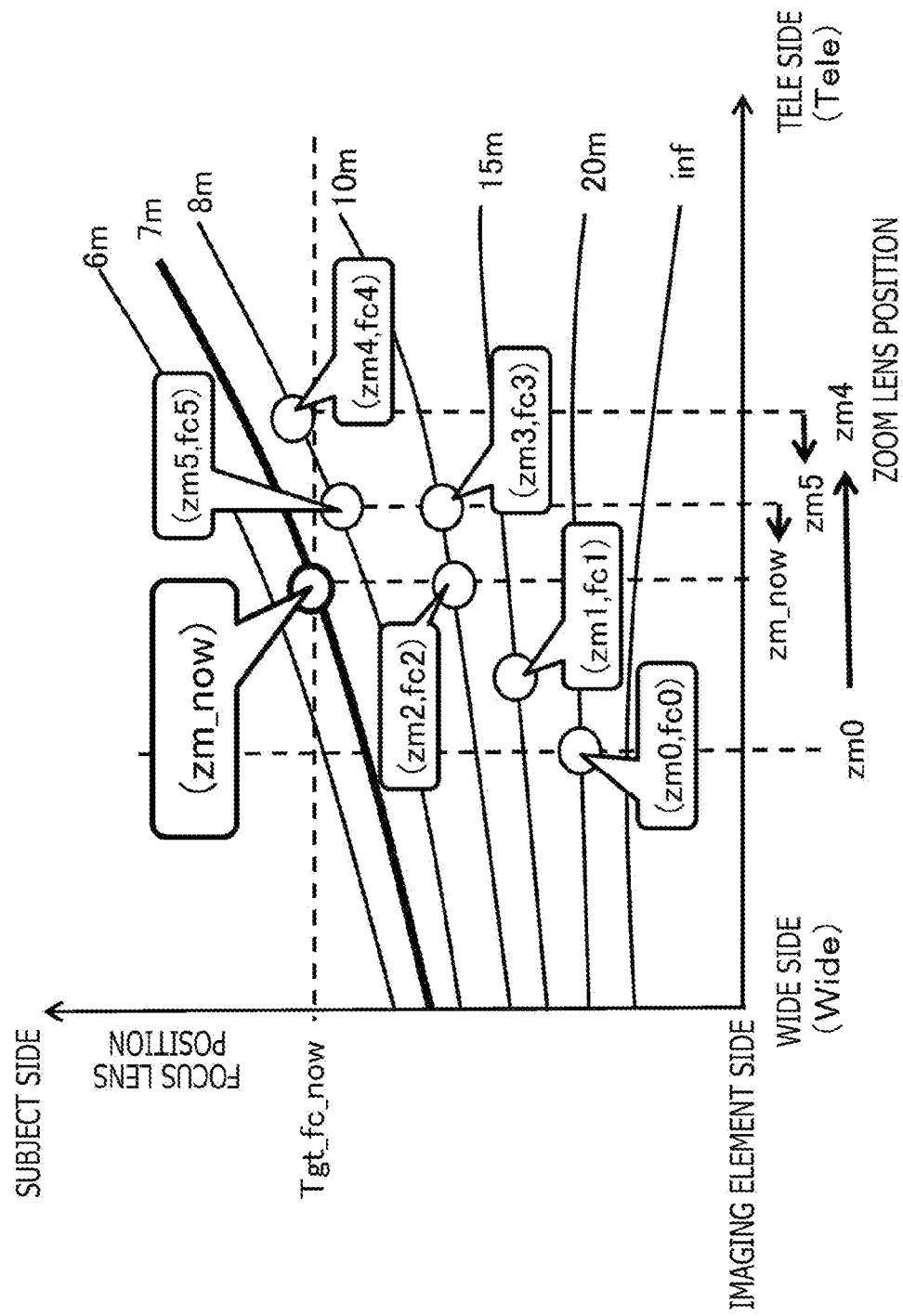
FIG. 20 is an explanatory diagram of focus lens driving, which is executed by the imaging system according to the present disclosure.

In FIG. 20, a line indicating the target focus lens position (Tgt_fc)=7 m inputted from the imaging device (body) 50 is a thick line.

This line of 7 m indicates the target focus lens position (Tgt_fc)=7 m inputted from the imaging device (body) 50. This indicates a subject distance for obtaining an in-focus state of the focus lens that is located at the already calculated focus lens reference position (Ref_fc).

The lens-side control section 22 detects, on the line of 7 m, a position corresponding to the current zoom lens position (zm_now).

The detected position is the position (zm_now) depicted in FIG. 20.

The focus lens position corresponding to the position (zm_now) is set as the latest target focus lens position (Tgt_fc now).

The target focus lens position (Tgt_fc)=7 m calculated in step S03 by the focus control section 80 on the imaging device (body) 50 side corresponds to a distance to a subject to be focused, calculated on the basis of the focus lens reference position (Ref_fc)=11.8 m and the defocus amount (DF)=−4.8 m.

However, thereafter, the zoom position is further changed to be set at the position (zm_now) depicted in FIG. 20.

At the latest zoom position (zm_now), the focus lens position for focusing on the subject at the subject distance=7 m is the latest target focus lens position (Tgt_fc now) which is obtained in accordance with the cam curve depicted in FIG. 20.

As described so far, the lens-side control section 22 newly calculates the latest target focus lens position (Tgt_fc now) from the cam curve by using the target focus lens position (Tgt_fc)=7 m inputted from the imaging device (body) 50 and the current zoom lens position (zm_now).

The lens-side control section 22 causes the focus lens driving section 34 to drive the focus lens 26 to the latest target focus lens position (Tgt_fc now).

As a result of this process, auto focus (AF) processing of driving the focus lens position to the in-focus position while reflecting the latest zoom position, can be performed.

Note that, in the aforementioned example of steps S03 to S05, the focus control section 80 of the imaging device (body) 50 transmits the subject distance (7 m) as the target focus lens position (Tgt_fc) to the lens-side control section 22 of the interchangeable lens 20.

This is one example. The target focus lens position (Tgt_fc) which is transmitted from the focus control section 80 of the imaging device (body) 50 to the lens-side control section 22 of the interchangeable lens 20 is not limited to the subject distance (7 m), and may be any data as long as the focus lens position for focusing on a subject can be decided from the data, and any other data may be used.

Specifically, for example, coordinate information (focus lens position, zoom lens position) regarding one point corresponding to the subject distance=7 m on the cam curve may be transmitted, as the target focus lens position (Tgt_fc), from the focus control section 80 of the imaging device (body) 50 to the lens-side control section 22 of the interchangeable lens 20.

In other words, the last zoom position (zm5) acquired during the exposure time period and the coordinate information (zm5, fcX) indicating the focus lens position (fcX) on the cam curve corresponding to this zoom position are transmitted, as the target focus lens position (Tgt_fc), by the focus control section 80 of the imaging device (body) 50 to the lens-side control section 22 of the interchangeable lens 20.

The lens-side control section 22 of the interchangeable lens 20 receives the coordinate information, and recognizes, by referring to the cam curve, that the coordinate position (zm5, fcX) is disposed at a point corresponding to the subject distance=7 m on the cam curve. Further, the focus lens position corresponding to the latest zoom position is calculated. The focus lens is driven by use of this calculated value as a command value.

For example, a configuration of performing the above processing may be adopted.

Thus, it is sufficient that the target focus lens position (Tgt_fc) which is transmitted from the imaging device (body) 50 to the interchangeable lens 20 is data with which a focus lens position for focusing on a subject can be decided, that is, subject distance information.

Note that, as explained above, the subject distance information is a generic term for information that can be applied for focusing processing, and represents at least a subject distance position or position information regarding a focus lens position and a zoom lens position in an in-focus position.

In steps S03 to S05, the subject distance information is transmitted from the imaging device (body) 50 to the interchangeable lens 20, whereby auto focus (AF) processing in which the latest zoom position is reflected is performed.

[5. Data Communication Between Interchangeable Lens and Imaging Device (Body), and Process Sequence Thereof]

Next, data communication which is performed between the interchangeable lens 20 and the imaging device (body) 50 in the aforementioned auto focus (AF) processing, and the process sequence thereof will be explained with reference to sequence diagrams depicted in FIGS. 21 and 22.

Figure 21:
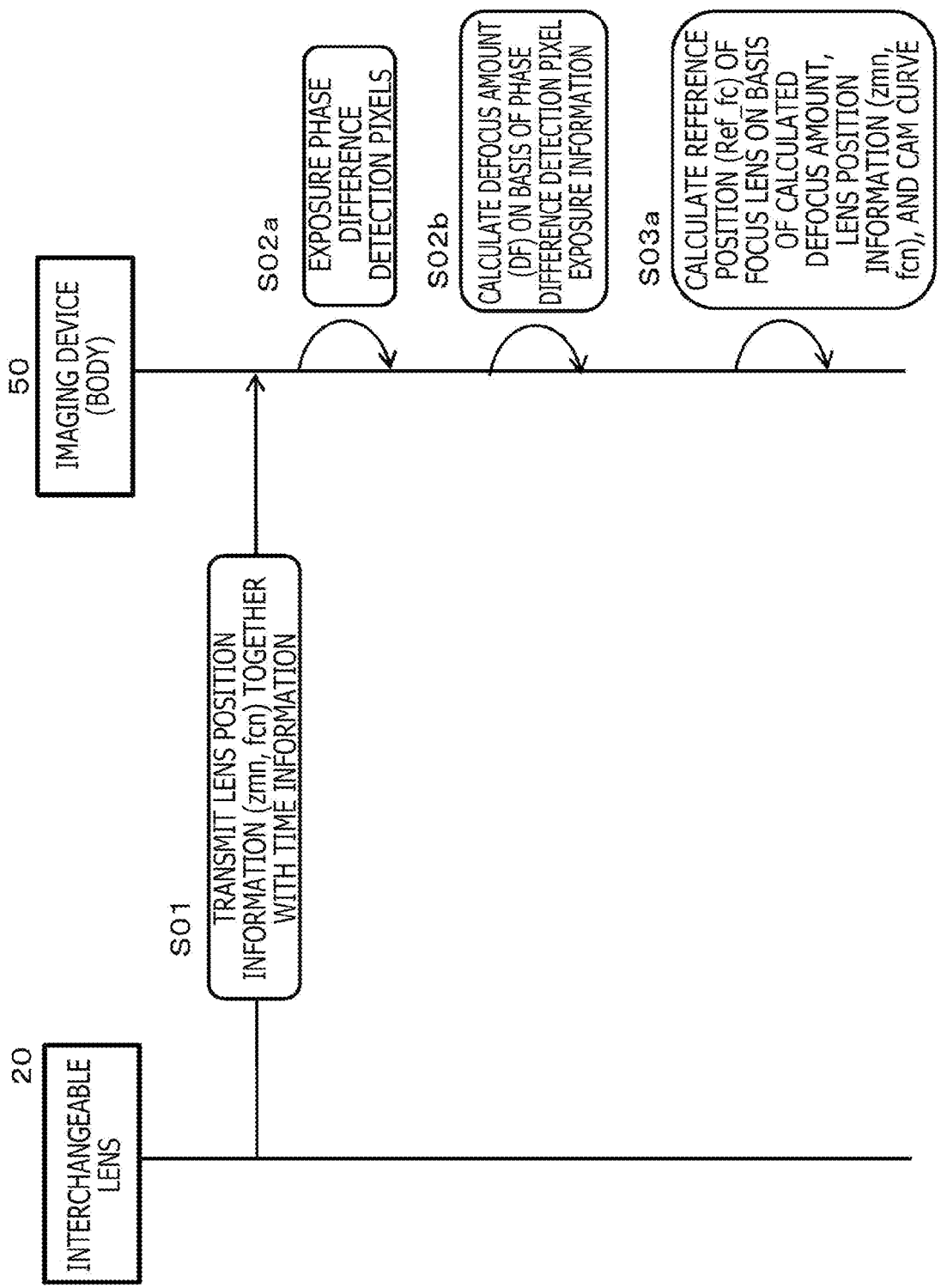
FIG. 21 is a sequence diagram for explaining a process sequence which is executed by the imaging system according to the present disclosure.
Figure 22:
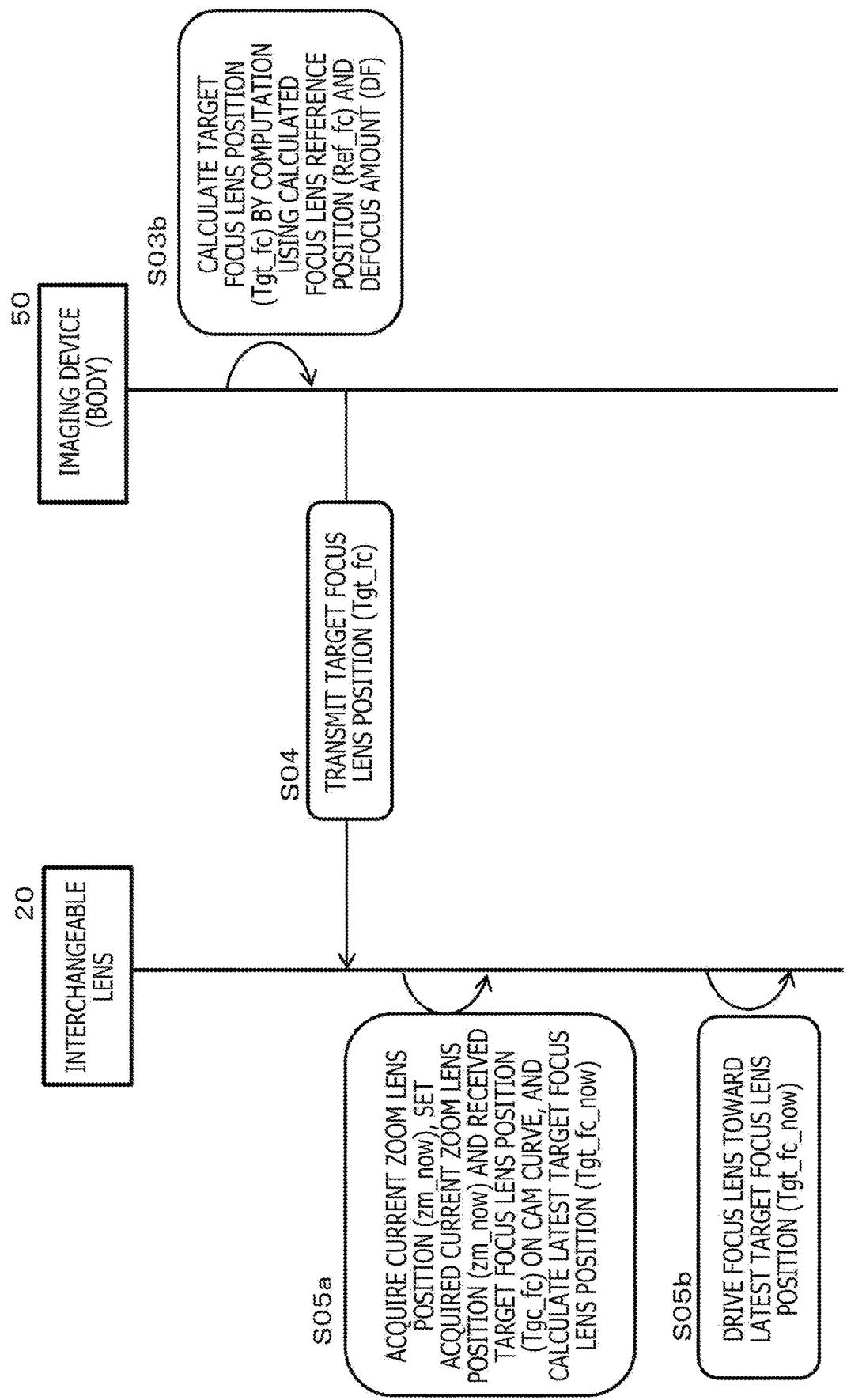
FIG. 22 is a sequence diagram for explaining a process sequence which is executed by the imaging system according to the present disclosure.

FIGS. 21 and 22 each depict a sequence diagram of data communication between the interchangeable lens 20 and the imaging device (body) 50, and the process sequence thereof.

Steps S01 to S05 depicted in FIGS. 21 and 22 correspond to steps S01 to S05 explained above with reference to FIG. 10 and FIGS. 11 to 20.

Hereinafter, these steps will be explained sequentially.
(Step S01)

Step S01 is transmission of lens position information (zmn, fcn) from the interchangeable lens 20 to the imaging device (body) 50.

This process has been explained above with reference to FIGS. 11 and 12. In this process, the lens position (state) detection section 27 of the interchangeable lens 20 regularly detects lens position information, that is, a focus lens position and a zoom lens position, and the detected lens position information is transmitted together with information regarding the acquisition time of the position information, from the interchangeable lens 20 side to the focus control section 80 of the imaging device (body) 50.

For example, the lens position (state) detection section 27 performs acquisition of the focus lens position (fcn) and the zoom lens position (zmn) at an interval of 4 msec or shorter, for example, and transmits, sequentially or as data obtained by compiling values obtained by multiple times of measurement, the acquired positions to the imaging device (body) 50.

The data explained above with reference to FIG. 12 is an example of the data which is transmitted from the interchangeable lens 20 to the imaging device (body) 50. As depicted in FIG. 12, data on the correspondence between the lens position information (zmn, fcn) and acquisition time (sampling time) information regarding the lens position information (zmn, fcn) is transmitted from the interchangeable lens 20 to the imaging device (body) 50. The transmitted data is stored in the memory 72 of the imaging device (body) 50.

(Steps S02a and S02b)

Steps S02a and S02b in FIG. 21 are depicted by dividing step S02 explained above with reference to FIG. 13.

As explained above with reference to FIGS. 10 and 13, in step S02, pixel information regarding the phase difference detection pixels in the imaging element 65 of the imaging device (body) 50 is inputted to the focus control section 80, and the defocus amount (DF) is calculated by the focus control section 80.

Step S02a in FIG. 21 represents exposure of the phase difference detection pixels in the imaging element 65 of the imaging device (body) 50 by use of light inputted via the interchangeable lens 20.

Step S02b is executed by the focus control section 80 of the imaging device (body) 50 on the basis of the result of the exposure in step S02a.

The focus control section 80 receives an input of pixel information regarding the phase difference detection pixels in the imaging element 65, and calculates the defocus amount (DF).

Exposure of the phase difference detection pixels is performed at a ($\frac{1}{60}$)-sec interval, for example, and the phase difference detection pixel information is inputted to the focus control section 80 at the ($\frac{1}{60}$)-sec interval. By using the phase difference detection pixel information, the focus control section 80 calculates the defocus amount (DF) at the ($\frac{1}{60}$)-sec interval.

However, as explained above, only one value is calculated as the defocus amount (DF) in accordance with one-time exposure of the phase difference detection pixels. Thus, in the case where the focus lens or the zoom lens is moving during the exposure time period (t1 to t2) of phase difference detection pixels, there is a problem that it is unclear at which point of time during the period from time t1 to t2, the position of the focus lens to which the calculated defocus amount (DF) corresponds is obtained.

(Steps S03a and 03b)

Steps S03a and 03b in FIGS. 21 and 22 are depicted by dividing step S03 explained above with reference to FIGS. 14 to 17.

As explained above with reference to FIG. 10 and FIGS. 14 to 17, step S03 is calculation of the target focus lens position (Tgt_fc) which is performed by the focus control section 80 of the imaging device (body) 50.

Step S03a in FIG. 21 is (1) calculation of a focus lens reference position (Ref_fc) having been explained with reference to FIGS. 14 to 17.

Step S03b in FIG. 22 is (2) calculation of a target focus lens position (Tgt_fc) having been explained with reference to FIGS. 14 to 17.

First, in step S03a, the focus control section 80 of the imaging device (body) 50 calculates the focus lens reference position (Ref_fc).

As explained above with reference to FIG. 14, the focus lens positions (fcn) and the zoom lens positions (zmn) obtained during the time period from the start time of the exposure of the phase difference detection pixels used for the calculation of the defocus amount (DF) in step S02b to the start time of the calculation of the defocus amount (DF), are used in this process.

For example, reference position calculation data depicted in the (2) interchangeable lens-side processing in FIG. 14 is used, for example. The reference position calculation data (zm0, fc0) to (zm5, fc5) is developed on the cam curve, whereby the focus lens reference position (Ref_fc) is calculated.

The focus control section 80 calculates the focus lens reference position (Ref_fc) by developing the reference position calculation data (zm0, fc0) to (zm5, fc5) on the cam curve.

This process is the process having been explained above with reference to FIG. 16.

The focus control section 80 detects, from the cam curve, points corresponding to the reference position calculation data (zm0, fc0) to (zm5, fc5), as depicted in FIG. 16.

The focus control section 80 calculates the focus lens reference position (Ref_fc) by using the points, on the cam curve, corresponding to the reference position calculation data (zm0, fc0) to (zm5, fc5).

Specifically, as explained above with reference to FIG. 17, the focus lens reference position (Ref_fc) is calculated by use of the points, on the cam curve, corresponding to the focus lens positions (fc0 to fc5) constituting the reference position calculation data (zm0, fc0) to (zm5, fc5), that is, subject distance information for obtaining an in-focus position.

The focus control section 80 calculates, as the focus lens reference position (Ref_fc), the average value (ave) of the points, on the cam curve, corresponding to the focus lens positions (fc0 to fc5) constituting the reference position calculation data, that is, the subject distance for obtaining an in-focus position, for example.

Note that, the focus lens reference position (Ref_fc) calculated here is not a value directly indicating the focus lens position in the interchangeable lens 20, but is a value obtained by converting the focus lens position into a subject distance.

The focus control section 80 calculates, as the focus lens reference position (Ref_fc), the distance (distance from the camera) to a subject distance to be focused.

As explained above, the focus lens reference position (Ref_fc) may be set not only from the points, on the cam curve, corresponding to the reference position calculation data (fcn to fcm), that is, the average value (ave) of the subject distance for obtaining an in-focus position, but also from the points, on the cam curve, corresponding to the reference position calculation data (fcn to fcm), that is, the intermediate value, the weighted average, or the like of the subject distance for obtaining an in-focus position, for example.

Next, step S03b depicted in FIG. 22, that is, calculation of the target focus lens position (Tgt_fc), will be explained.

The focus control section 80 calculates the target focus lens position (Tgt_fc) for obtaining an in-focus state of the focus lens, by using the reference focus lens position (Ref_fc) calculated in step S03a, and the defocus amount (DF) calculated in the previous step S02b.

As explained above with reference to FIG. 17, the focus control section 80 calculates the target focus lens position (Tgt_fc) in accordance with the following expression:

$$Tgt\_fc = (Ref\_fc) + (DF).$$

Note that the target focus lens position (Tgt_fc) calculated by the above expression is not a value directly indicating the focus lens position in the interchangeable lens 20, but a value obtained by converting the focus lens position to a subject distance.

(Step S04)

In step S04 depicted in FIG. 22, the target focus lens position (Tgt_fc) calculated by the focus control section 80 of the imaging device (body) 50 is transmitted from the body-side control section 62 of the imaging device (body) 50 to the lens-side control section 22 of the interchangeable lens 20.

This process has been explained above with reference to FIG. 18.

(Steps S05a and S05b)

Steps S05a and 05b in FIG. 22 are depicted by dividing the process in step S05 having been explained above with reference to FIGS. 19 and 20.

As explained above with reference to FIGS. 19 and 20, step S05 is executed by the lens-side control section 22 and the focus lens driving section 34 of the interchangeable lens 20, and is for driving the focus lens to focus on a subject.

First, the lens-side control section 22 of the interchangeable lens 20 receives an input of the target focus lens position (Tgt_fc) from the imaging device (body) 50, and then, acquires the latest zoom lens position (zm_now) at present.

This information is acquired from the lens position (state) detection section 27 of the interchangeable lens 20.

Next, the lens-side control section 22 detects, from the cam curve acquired from the memory 42, corresponding positions between the target focus lens position (Tgt_fc) inputted from the imaging device (body) 50 and the current zoom lens position (zm_now), and newly calculates the latest target focus lens position (Tgt_fc now) in accordance with the detected positions.

This process is the process having been explained above with reference to FIG. 20.

Next, in step S05b in FIG. 22, the lens-side control section 22 causes the focus lens driving section 34 to drive the focus lens 26 to the latest target focus lens position (Tgt_fc now).

By this process, auto focus (AF) processing in which the focus lens position is driven to the in-focus position while the latest zoom position is reflected, can be performed.

Note that, as explained above, the target focus lens position (Tgt_fc) which is transmitted from the imaging device (body) 50 to the interchangeable lens 20 in steps S03 to S05 described above is not limited to data on a subject distance itself, and may be data with which the focus lens position for focusing on a subject can be decided, that is, the subject distance information.

Note that, as explained above, the subject distance information is a generic term for information that can be applied for focusing processing, and represents at least a subject distance position or position information regarding a focus lens position and a zoom lens position in an in-focus position.

In steps S03 to S05 described above, the subject distance information is transmitted from the imaging device (body) 50 to the interchangeable lens 20, whereby auto focus (AF) processing in which the latest zoom position is reflected is performed.

[6. Conclusion of Configuration According to Present Disclosure]

An embodiment according to the present disclosure have been explained in detail with reference to specific embodiments. However, it is obvious that a person skilled in the art can make any modification or alternative within the scope of the gist of the present disclosure. In other words, the present disclosure has been disclosed by exemplification, and should not be interpreted in a limited manner. In order to determine the gist of the present disclosure, the claims should be taken into consideration.

Note that the technique disclosed herein may also have the following configurations.

(1) An interchangeable lens device including a memory that stores a cam curve representing a relationship between a position of a zoom lens and a position of a focus lens according to a subject distance, and a control section that performs focus control by driving the focus lens, wherein the control section transmits zoom lens position information indicating the position of the zoom lens and focus lens position information indicating the position of the focus lens to an imaging device, and performs the focus control on the basis of subject distance information indicating a substance distance which is calculated by the imaging device with use of the zoom lens position information and the focus lens position information acquired from the control section, and on the basis of the cam curve.

(2) The interchangeable lens device according to (1), in which the control section further transmits the cam curve to the imaging device.

(3) The interchangeable lens device according to (1) or (2), in which the control section performs the focus control on the basis of the subject distance information which is calculated by the imaging device with use of multiple sets of the zoom lens position information and multiple sets of the focus lens position information acquired from the control section at a predetermined time interval during an exposure time period of a detection information acquisition pixel for use in calculation of a defocus amount, and on the basis of the cam curve.

(4) The interchangeable lens device according to any one of (1) to (3), in which
the control section
acquires a latest zoom lens position after receiving an input of the subject distance information from the imaging device, and
detects, from the cam curve, a corresponding point between the subject distance information and the latest zoom lens position, and performs the focus control on the basis of the detected corresponding point.

(5) The interchangeable lens device according to any one of (1) to (4), in which
the control section acquires lens position information regarding the focus lens and the zoom lens at least two or more times at a predetermined time interval during an exposure time period of the detection information acquisition pixel, and outputs the lens position information to the imaging device.

(6) The interchangeable lens device according to any one of (1) to (5), in which
the detection information acquisition pixel includes a phase difference detection pixel, and
the control section acquires lens position information regarding the focus lens and the zoom lens at a predetermined time interval during an exposure time period of the phase difference detection pixel, and outputs the lens position information to the imaging device.

(7) The interchangeable lens device according to any one of (1) to (6), in which
the control section outputs, to the imaging device, information concerning a time at which lens position information regarding the focus lens and the zoom lens is acquired, in association with the lens position information.

(8) An imaging device including
a memory that stores a cam curve representing a relationship between a position of a zoom lens and a position of a focus lens according to a subject distance, and
a focus control section that calculates an in-focus position of the focus lens, wherein
the focus control section
receives an input of pixel information regarding a detection information acquisition pixel, and calculates a defocus amount,
receives, from a connected interchangeable lens device, an input of multiple sets of lens position information regarding the focus lens and the zoom lens acquired at a predetermined time interval during an exposure time period of the detection information acquisition pixel,
detects points, on the cam curve, corresponding to the multiple sets of lens position information, and calculates a reference focus lens position by using the detected corresponding points on the cam curve, and
calculates subject distance information indicating a subject distance, by using the calculated reference focus lens position and the defocus amount.

(9) The imaging device according to (8), in which
the focus control section
sets, as reference position calculation data, multiple sets of lens position information regarding the focus lens and the zoom lens acquired during a time period from start of the exposure time period of the detection information acquisition pixel to start of calculation of the defocus amount, and
calculates the reference focus lens position by using the reference position calculation data.

(10) The imaging device according to (8) or (9), in which
the focus control section
detects points, on the cam curve, corresponding to the multiple sets of lens position information, and calculates, as the reference focus lens position, an average value of multiple sets of subject distance information constituting the detected corresponding points on the cam curve.

(11) The imaging device according to any one of (8) to (10), in which
the focus control section
detects points, on the cam curve, corresponding to the multiple sets of lens position information, and calculates, as the reference focus lens position, an intermediate value or a weighted average value of multiple sets of subject distance information constituting the detected corresponding points on the cam curve.

(12) The imaging device according to any one of (8) to (10), in which
the detection information acquisition pixel includes a phase difference detection pixel, and
the focus control section receives an input of pixel information regarding the phase difference detection pixel, and calculates a defocus amount.

(13) An imaging system including an interchangeable lens and an imaging device, in which
the interchangeable lens
acquires lens position information regarding a focus lens and a zoom lens at a predetermined time interval during an exposure time period of a detection information acquisition pixel for use in calculation of a defocus amount, and outputs the lens position information to the imaging device, and
the imaging device
receives an input of pixel information regarding the detection information acquisition pixel, and calculates a defocus amount,
calculates a reference focus lens position by using the lens position information inputted from the interchangeable lens, and
calculates subject distance information indicating a subject distance, by using the calculated reference focus lens position and the defocus amount, and outputs the subject distance information to the interchangeable lens.

(14) The imaging system according to (13), in which
the imaging device
includes a memory that stores a cam curve representing a relationship between a position of the zoom lens and a position of the focus lens according to a subject distance, and
detects points, on the cam curve, corresponding to multiple sets of the lens position information, and calculates a reference focus lens position by using the detected corresponding points on the cam curve.

(15) The imaging system according to (13) or (14), in which
the interchangeable lens
includes a memory that stores a cam curve representing a relationship between a position of the zoom lens and a position of the focus lens according to a subject distance,
acquires a latest zoom lens position after receiving an input of the subject distance information from the imaging device, and detects, from the cam curve, a corresponding point between the subject distance information and the latest zoom lens position, and performs the focus control on the basis of the detected corresponding point.

(16) A focus control method which is executed by an interchangeable lens device,
the interchangeable lens including
a memory that stores a cam curve representing a relationship between a position of a zoom lens and a position of a focus lens according to a subject distance, and
a control section that performs focus control by driving the focus lens, and
the method including, by means of the control section:
transmitting zoom lens position information indicating the position of the zoom lens and focus lens position information indicating the position of the focus lens to an imaging device; and
performing the focus control on the basis of subject distance information indicating a subject distance which is calculated by the imaging device with use of the zoom lens position information and the focus lens position information acquired from the control section, and on the basis of the cam curve.

(17) A focus control method which is executed by an imaging device,
the imaging device including
a memory that stores a cam curve representing a relationship between a position of a zoom lens and a position of a focus lens according to a subject distance, and
a focus control section that calculates an in-focus position of the focus lens, and
the method including, by means of the focus control section:
receiving an input of pixel information regarding a detection information acquisition pixel, and calculating a defocus amount;
receiving, from a connected interchangeable lens device, an input of multiple sets of lens position information regarding the focus lens and the zoom lens acquired at a predetermined time interval during an exposure time period of the detection information acquisition pixel;
detecting points, on the cam curve, corresponding to the multiple sets of lens position information, and calculating a reference focus lens position by using the detected corresponding points on the cam curve; and
calculating subject distance information indicating a subject distance by using the calculated reference focus lens position and the defocus amount.

(18) A program for causing an interchangeable lens device to perform focus control processing,
the interchangeable lens including
a memory that stores a cam curve representing a relationship between a position of a zoom lens and a position of a focus lens according to a subject distance, and
a control section that performs focus control by driving the focus lens, and
the program being for causing the control section to:
transmit zoom lens position information indicating the position of the zoom lens and focus lens position information indicating the position of the focus lens to an imaging device; and
perform the focus control on the basis of subject distance information indicating a subject distance which is calculated by the imaging device with use of the zoom lens position information and the focus lens position information acquired from the control section, and on the basis of the cam curve.

(19) A program for causing an imaging device to perform focus control processing,
the imaging device including
a memory that stores a cam curve representing a relationship between a position of a zoom lens and a position of a focus lens according to a subject distance, and
a focus control section that calculates an in-focus position of the focus lens, and
the program being for causing the focus control section to execute:
reception of an input of pixel information regarding a detection information acquisition pixel and calculation of a defocus amount;
reception, from a connected interchangeable lens device, of an input of multiple sets of lens position information regarding the focus lens and the zoom lens acquired at a predetermined time interval during an exposure time period of the detection information acquisition pixel;
detection of points, on the cam curve, corresponding to the multiple sets of lens position information, and calculation of a reference focus lens position by using the detected corresponding points on the cam curve; and
calculation of subject distance information indicating a subject distance by using the calculated reference focus lens position and the defocus amount.

Further, the series of processes described herein can be executed by hardware, software, or a composite structure thereof. When the processes are executed by software, a program having a process sequence therefor recorded therein can be executed after being installed in a memory incorporated in dedicated hardware in a computer, or can be executed after being installed in a general-purpose computer capable of executing various processes. For example, such a program may previously be recorded in a recording medium. The program can be installed in the computer from the recording medium. Alternatively, the program can be received over a network such as a LAN (local area network) or the Internet, and be installed in a recording medium such as an internal hard disk.

Note that the processes described herein are not necessarily executed in the described time-series, and the processes may be executed parallelly or separately, as needed or in accordance with the processing capacity of a device to execute the processes. Further, in the present description, a system refers to a logical set structure including a plurality of devices, and the devices of the structure are not necessarily included in the same casing.

INDUSTRIAL APPLICABILITY

With the configuration according to one embodiment of the present disclosure, a device and a method by which high-precision auto focus (AF) processing can be performed while a focus lens or a zoom lens is being operated, are implemented, as explained above.

Specifically, for example, an interchangeable lens acquires position information regarding a focus lens and a zoom lens at a predetermined time interval during an exposure time period of detection information acquisition pixels for use in calculation of a defocus amount (DF), and outputs the position information to an imaging device. The imaging device calculates the defocus amount (DF) by using information regarding the detection information acquisition pixels, calculates a reference focus lens position (Ref_fc) by using points, on a cam curve, corresponding to the inputted lens position information, calculates a target focus lens position (Tgt_fc) in an in-focus position, from the reference focus lens position (Ref_fc) and the defocus amount (DF), and outputs the target focus lens position (Tgt_fc) to the interchangeable lens.

With this configuration, a device and a method by which high-precision auto focus (AF) processing can be performed while a focus lens or a zoom lens is being operated, are implemented.

REFERENCE SIGNS LIST

1 Imaging system
2 Interchangeable lens
5 Imaging device (body)
6 Imaging element
7 Display section
8 Operation section (shutter button)
10 Imaging system
20 Interchangeable lens
21 Mount section
22 Lens-side control section
23 Zoom lens
24 Hand shake correction lens
25 Aperture
26 Focus lens
27 Lens position (state) detection section
31 Zoom lens driving section
32 Hand shake control section
33 Aperture control section
34 Focus lens driving section
41 Operation section
42 Memory
43 Power supply control section
50 Imaging device (body)
61 Mount section
62 Body-side control section
63 Shutter
64 Shutter control section
65 Imaging element
66 AD conversion section
67 Frame memory
68 Image signal processing section
69 Recording section
71 Display section
72 Memory
75 Power supply section
76 Power supply control section
78 Operation section
80 Focus control section

The invention claimed is:

1. An interchangeable lens device comprising:
a memory that stores a cam curve representing a relationship between a position of a zoom lens and a position of a focus lens according to a subject distance; and
a control circuitry configured to
transmit zoom lens position information indicating the position of the zoom lens and focus lens position information indicating the position of the focus lens to an imaging device,
responsive to transmitting the zoom lens position information and the focus lens position information, receive second focus lens position information from the imaging device, the second focus lens position information based on the zoom lens position information and the focus lens position information, and
perform focus control by driving the focus lens, the focus control based on the second focus lens position information and the cam curve.

2. The interchangeable lens device according to claim 1, wherein
the control circuitry is further configured to transmit the cam curve to the imaging device.

3. The interchangeable lens device according to claim 1, wherein
the second focus lens position information is also based on multiple sets of the zoom lens position information and multiple sets of the focus lens position information acquired from the control circuitry at a predetermined time interval during an exposure time period of a detection information acquisition pixel for use in calculation of a defocus amount.

4. The interchangeable lens device according to claim 1, wherein
the control circuitry is further configured to
acquire a latest zoom lens position after receiving an input of the second focus lens position information from the imaging device, and
detect, from the cam curve, a corresponding point between the second focus lens position information and the latest zoom lens position, and
wherein the focus control is also based on the corresponding point that is detected.

5. The interchangeable lens device according to claim 1, wherein
the control circuitry is further configured to
acquire lens position information regarding the focus lens and the zoom lens at least two or more times at a predetermined time interval during an exposure time period of a detection information acquisition pixel, and
output the lens position information to the imaging device.

6. The interchangeable lens device according to claim 1, wherein
the control circuitry is further configured to
acquire lens position information regarding the focus lens and the zoom lens at a predetermined time interval during an exposure time period of a phase difference detection pixel, and
output the lens position information to the imaging device.

7. The interchangeable lens device according to claim 1, wherein
the control circuitry is further configured to
output, to the imaging device, information concerning a time at which lens position information regarding the focus lens and the zoom lens is acquired, in association with the lens position information.

8. An imaging device comprising:
a memory that stores a cam curve representing a relationship between a position of a zoom lens and a position of a focus lens according to a subject distance; and
a focus control circuitry configured to calculate an in-focus position of the focus lens, wherein
the focus control circuitry is further configured to
receive an input of pixel information regarding a detection information acquisition pixel,
calculate a defocus amount based on the input of the pixel information,
receive, from a connected interchangeable lens device, an input of multiple sets of lens position information regarding the focus lens and the zoom lens acquired at a predetermined time interval during an exposure time period of the detection information acquisition pixel,
detect points, on the cam curve, corresponding to the multiple sets of lens position information,
calculate an average value of multiple sets of the points that are detected on the cam curve, and
calculate second focus lens position information by using the average value and the defocus amount.

9. The imaging device according to claim 8, wherein the focus control circuitry is further configured to
set the multiple sets of lens position information regarding the focus lens and the zoom lens acquired during a time period from start of the exposure time period of the detection information acquisition pixel to start of calculation of the defocus amount, and
calculate the average value by using the multiple sets of lens position information.

10. The imaging device according to claim 8, wherein the focus control circuitry is further configured to
calculate an intermediate value or a weighted average value of multiple sets constituting the points that are detected on the cam curve, and
calculate the second focus lens position information by using the intermediate value or the weighted average value and the defocus amount.

11. The imaging device according to claim 8, wherein the detection information acquisition pixel includes a phase difference detection pixel, and
the focus control circuitry is further configured to
receive the input of the pixel information regarding the phase difference detection pixel, and
calculate the defocus amount based on the input of the pixel information.

12. An imaging system comprising an interchangeable lens and an imaging device, wherein the interchangeable lens is configured to
acquire lens position information regarding a focus lens and a zoom lens at a predetermined time interval during an exposure time period of a detection information acquisition pixel for use in calculation of a defocus amount, and
output the lens position information to the imaging device, and
the imaging device is configured to
receive an input of pixel information regarding the detection information acquisition pixel,
calculate the defocus amount based on the input of the pixel information,
calculate second focus lens position information by using the lens position information from the interchangeable lens and the defocus amount, and
output the second focus lens position information to the interchangeable lens,
wherein
the imaging device includes a memory that stores a cam curve representing a relationship between a position of the zoom lens and a position of the focus lens according to the subject distance, and
the imaging device is further configured to
detect points, on the cam curve, corresponding to multiple sets of the lens Position information,
calculate an average value of multiple sets of the points that are detected on the cam curve, and
calculate the second focus lens position information by using the average value and the defocus amount.

13. An imaging system comprising an interchangeable lens and an imaging device, wherein the interchangeable lens is configured to
acquire lens position information regarding a focus lens and a zoom lens at a predetermined time interval during an exposure time period of a detection information acquisition pixel for use in calculation of a defocus amount, and
output the lens position information to the imaging device, and
the imaging device is configured to
receive an input of pixel information regarding the detection information acquisition pixel,
calculate the defocus amount based on the input of the pixel information,
calculate second focus lens position information by using the lens position information from the interchangeable lens and the defocus amount, and
output the second focus lens position information to the interchangeable lens,
the interchangeable lens includes a memory that stores a cam curve representing a relationship between a position of the zoom lens and a position of the focus lens according to the subject distance, and
the interchangeable lens is further configured to
acquire a latest zoom lens position after receiving an input of the second focus lens position information from the imaging device,
detect, from the cam curve, a corresponding point between the second focus lens position information and the latest zoom lens position, and
perform focus control based on the corresponding point that is detected.

14. A focus control method comprising:
transmitting, with a control circuitry of an interchangeable lens, zoom lens position information indicating a position of a zoom lens and focus lens position information indicating a position of a focus lens to an imaging device;
responsive to transmitting the zoom lens position information and the focus lens position information, receiving second focus lens position information from the imaging device, the second focus lens position information based on the zoom lens position information and the focus lens position information; and
performing, with the control circuitry, focus control on a basis of the second focus lens position information that is received and a cam curve.

15. A focus control method comprising:
receiving, with a focus control circuitry of an imaging device, an input of pixel information regarding a detection information acquisition pixel;
calculating, with the focus control circuitry, a defocus amount based on the input of the pixel information;
receiving, with the focus control circuitry, from a connected interchangeable lens device, an input of multiple sets of lens position information regarding a focus lens and a zoom lens acquired at a predetermined time interval during an exposure time period of the detection information acquisition pixel;
detecting points, with the focus control circuitry, on a cam curve, corresponding to the multiple sets of lens position information;
calculating, with the focus control circuitry, an average value of multiple sets of the points that are detected on the cam curve; and calculating, with the focus control circuitry, second focus lens position information by using the average value and the defocus amount.

16. A non-transitory computer-readable medium comprising a program that, when executed by a control circuitry of an interchangeable lens device, causes the control circuitry to perform focus control processing comprising:
- transmitting zoom lens position information indicating a position of to zoom lens and focus lens position information indicating a position of a focus lens to an imaging device;
- responsive to transmitting the zoom lens position information and the focus lens position information, receiving second focus lens position information from the imaging device, the second focus lens position information based on the zoom lens position information and the focus lens position information; and
- performing the focus control on a basis of the second focus lens position information and a cam curve.

17. A non-transitory computer-readable medium comprising a program that, when executed by an imaging device, causes the imaging device to perform focus control processing comprising:
- receiving an input of pixel information regarding a detection information acquisition pixel and calculation of a defocus amount;
- receiving, from a connected interchangeable lens device, an input of multiple sets of lens position information regarding a focus lens and a zoom lens acquired at a predetermined time interval during an exposure time period of the detection information acquisition pixel;
- detecting points, on a cam curve, corresponding to the multiple sets of lens position information;
- calculating an average value of multiple sets of the points that are detected on the cam curve; and
- calculating second focus lens position information by using the average value and the defocus amount.

* * * * *